United States Patent [19]

Eichenhofer et al.

[11] Patent Number: 4,771,662

[45] Date of Patent: * Sep. 20, 1988

[54] MULTI-SPINDLE CHUCKING MACHINE

[75] Inventors: Josef Eichenhofer, Brampton, Canada; Karl P. Schubert, Cleveland, Ohio

[73] Assignee: Hofer Industries Inc., Brampton, Canada

[*] Notice: The portion of the term of this patent subsequent to May 19, 2004 has been disclaimed.

[21] Appl. No.: 49,199

[22] Filed: May 13, 1987

Related U.S. Application Data

[63] Continuation-in-part of Ser. No. 704,792, Feb. 25, 1985, Pat. No. 4,665,781.

[51] Int. Cl.$^4$ .............................................. B23B 9/10
[52] U.S. Cl. .............................................................. 82/3
[58] Field of Search ..................... 82/3, 21 R, 28 R; 192/53 B, 53 D, 53 R

[56] References Cited

U.S. PATENT DOCUMENTS

| | | |
|---|---|---|
| 1,512,381 | 10/1924 | Turcott . |
| 1,829,284 | 10/1931 | Lewis . |
| 3,063,131 | 11/1962 | Fenn . |
| 3,063,529 | 11/1962 | Cook .................................. 192/53 B |
| 3,161,270 | 12/1964 | Schauer ............................. 192/53 B |
| 3,292,466 | 12/1966 | Jacoby . |
| 3,339,440 | 9/1967 | Tsuda . |
| 3,688,363 | 9/1972 | Thobroe . |
| 3,990,133 | 11/1976 | Schalles et al. . |
| 4,048,880 | 9/1977 | Link ........................................ 82/3 |
| 4,185,366 | 1/1980 | Gilbert . |
| 4,665,781 | 5/1987 | Eichenhofer ............................ 82/3 |

FOREIGN PATENT DOCUMENTS

| | | |
|---|---|---|
| 1477800 | 1/1969 | Fed. Rep. of Germany . |
| 1752738 | 7/1971 | Fed. Rep. of Germany . |
| 2156458 | 5/1973 | Fed. Rep. of Germany . |
| 2333635 | 2/1974 | Fed. Rep. of Germany . |
| 2264899 | 8/1975 | Fed. Rep. of Germany . |
| 3001390 | 7/1980 | Fed. Rep. of Germany . |
| 918231 | 2/1963 | United Kingdom . |
| 1263135 | 2/1972 | United Kingdom . |
| 1373152 | 11/1974 | United Kingdom . |

Primary Examiner—Frederick R. Schmidt
Assistant Examiner—Blynn Shideler
Attorney, Agent, or Firm—Rogers, Bereskin & Parr

[57] ABSTRACT

A machine tool includes a carrier supporting a plurality of rotary spindles each carrying a chuck for holding a workpiece and each having an individual drive motor. The carrier can be indexed to move the spindles between different stations, while the drive motors remain stationary. Clutches are provided to couple each drive motor to a spindle to be driven. The carrier includes a central shaft supported at its ends on bearings and spindles are coupled to the shaft by supports. Each spindle may be provided with a friction clutch and a tooth clutch for coupling the spindle to the drive motor. The chuck is actuated by a hydraulic piston and cylinder which may be internal to the spindle. Alternatively, the cylinder may be formed by a stationary housing around the spindle containing an annular piston. A shuttle assemble capable of providing a mechanical advantage may be provided for transmitting motion of the piston to the chuck.

22 Claims, 18 Drawing Sheets

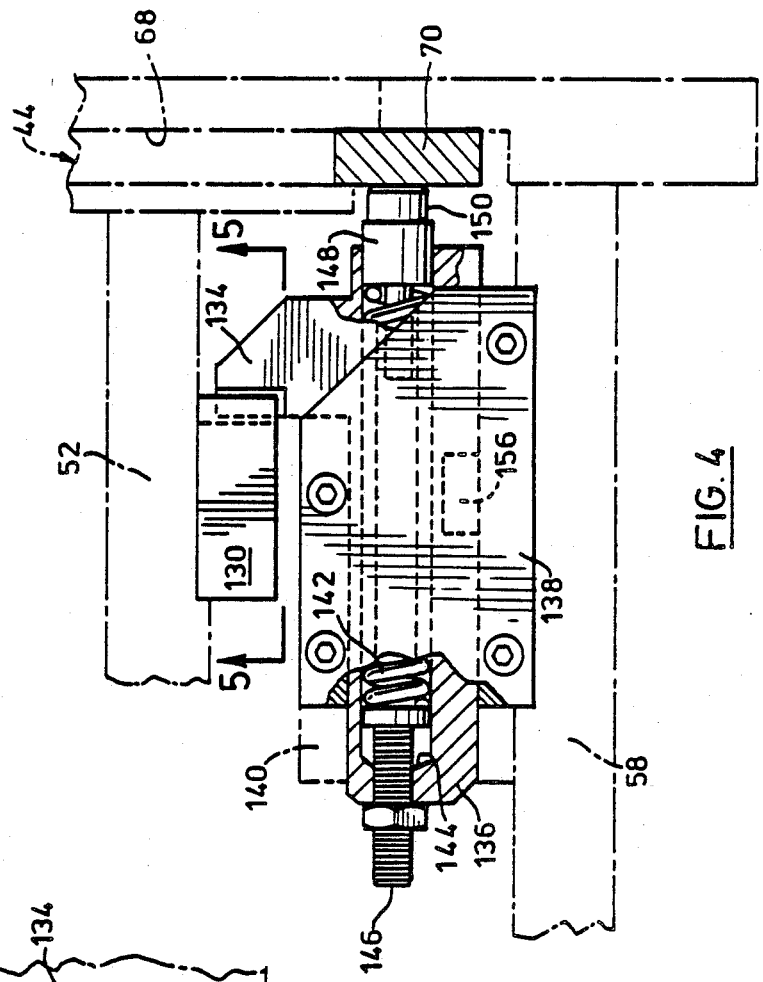
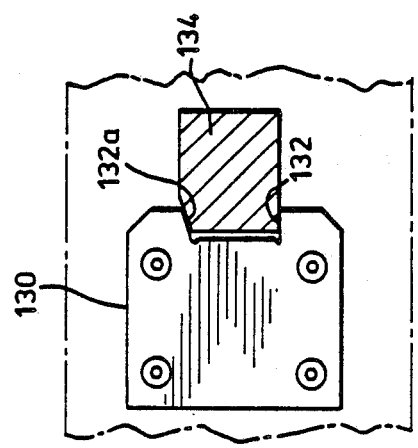
FIG. 4
FIG. 5

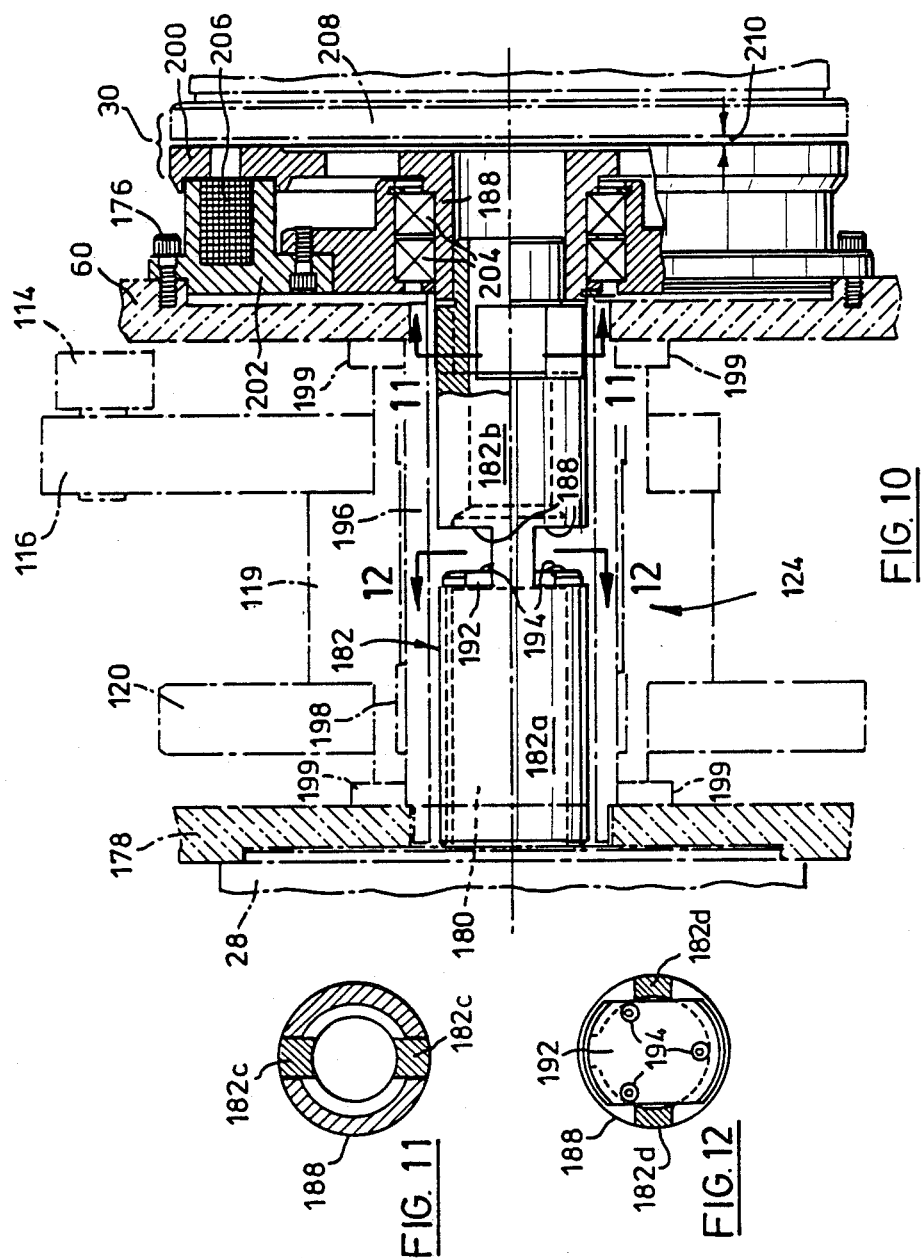

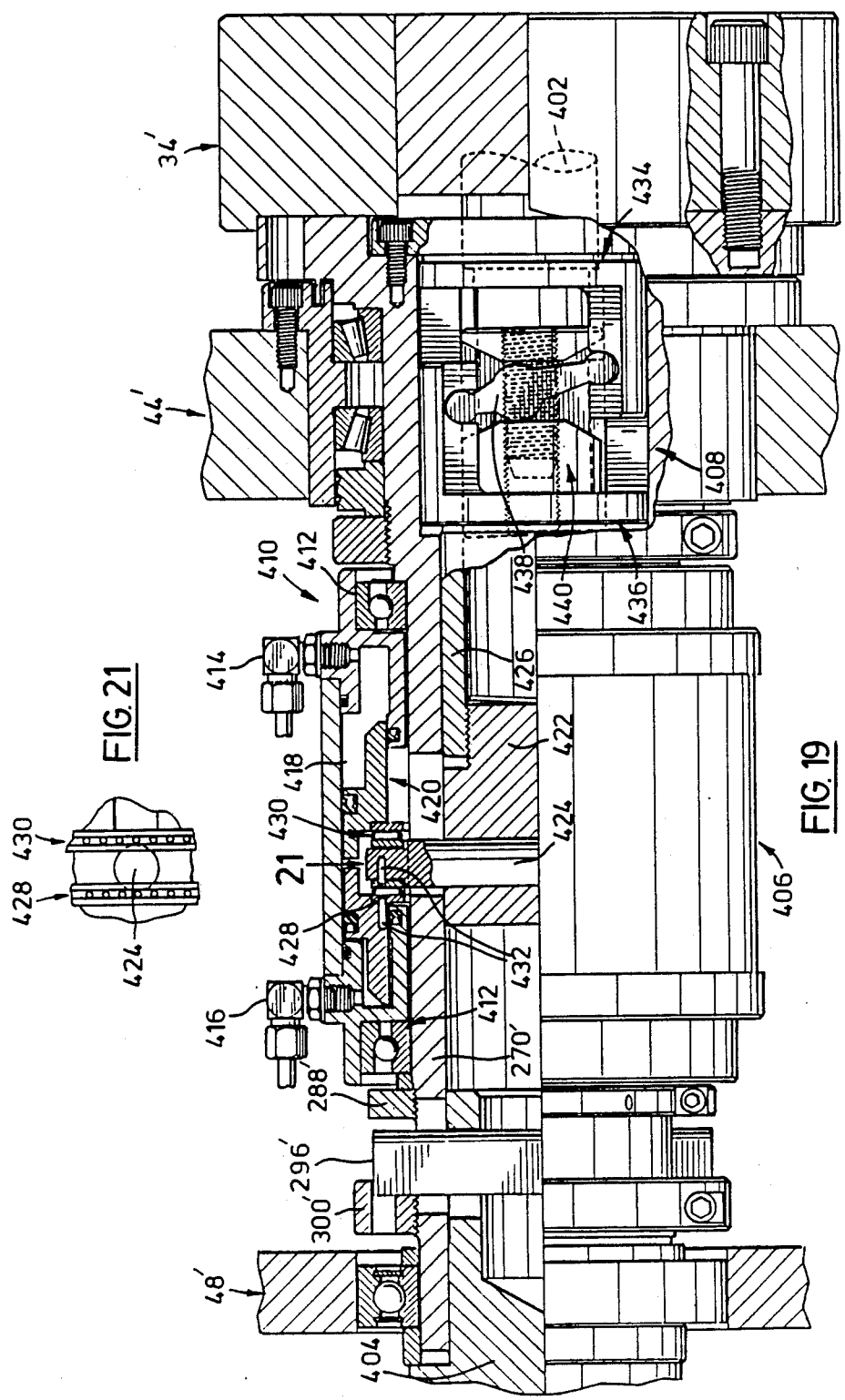

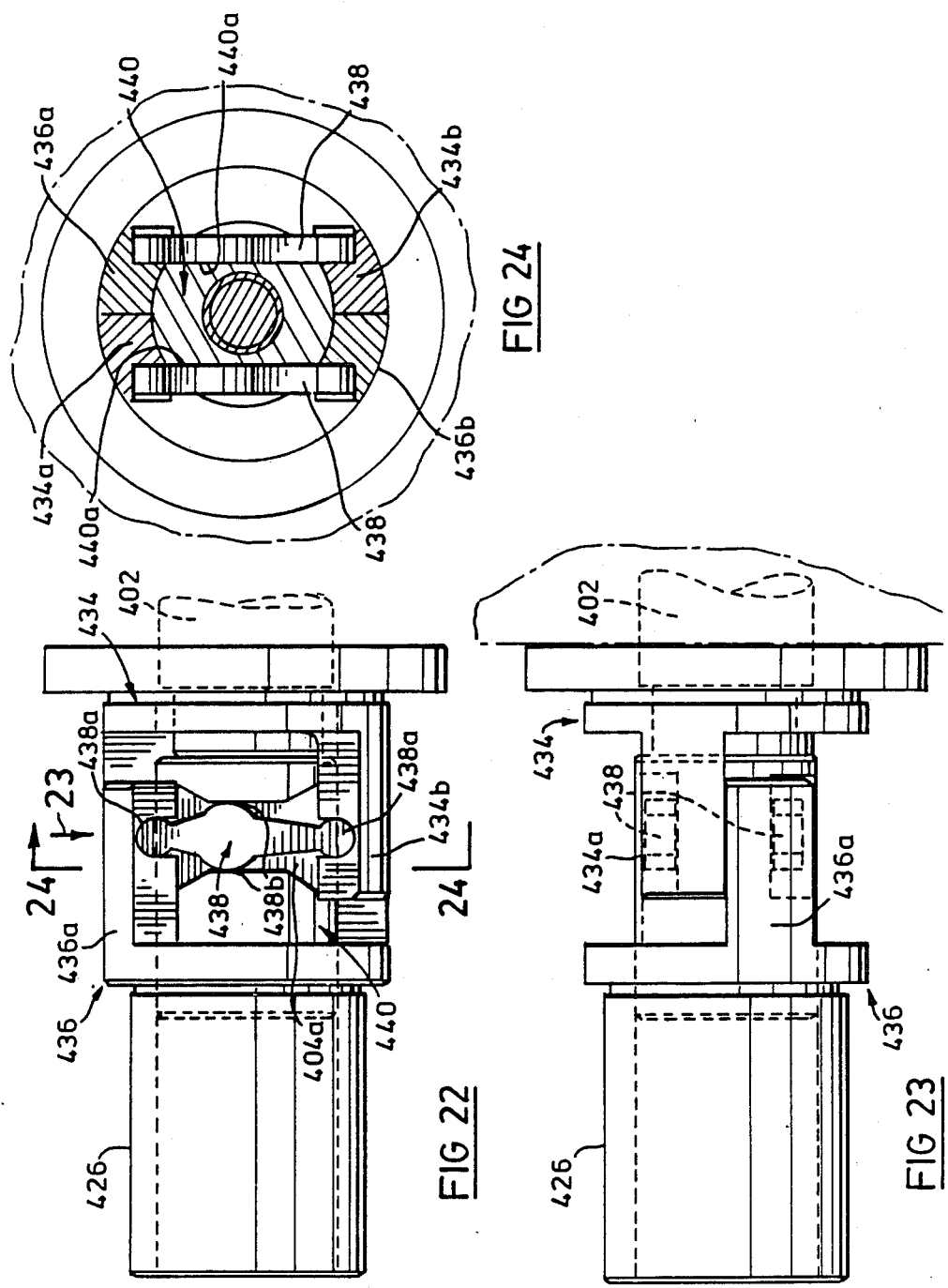

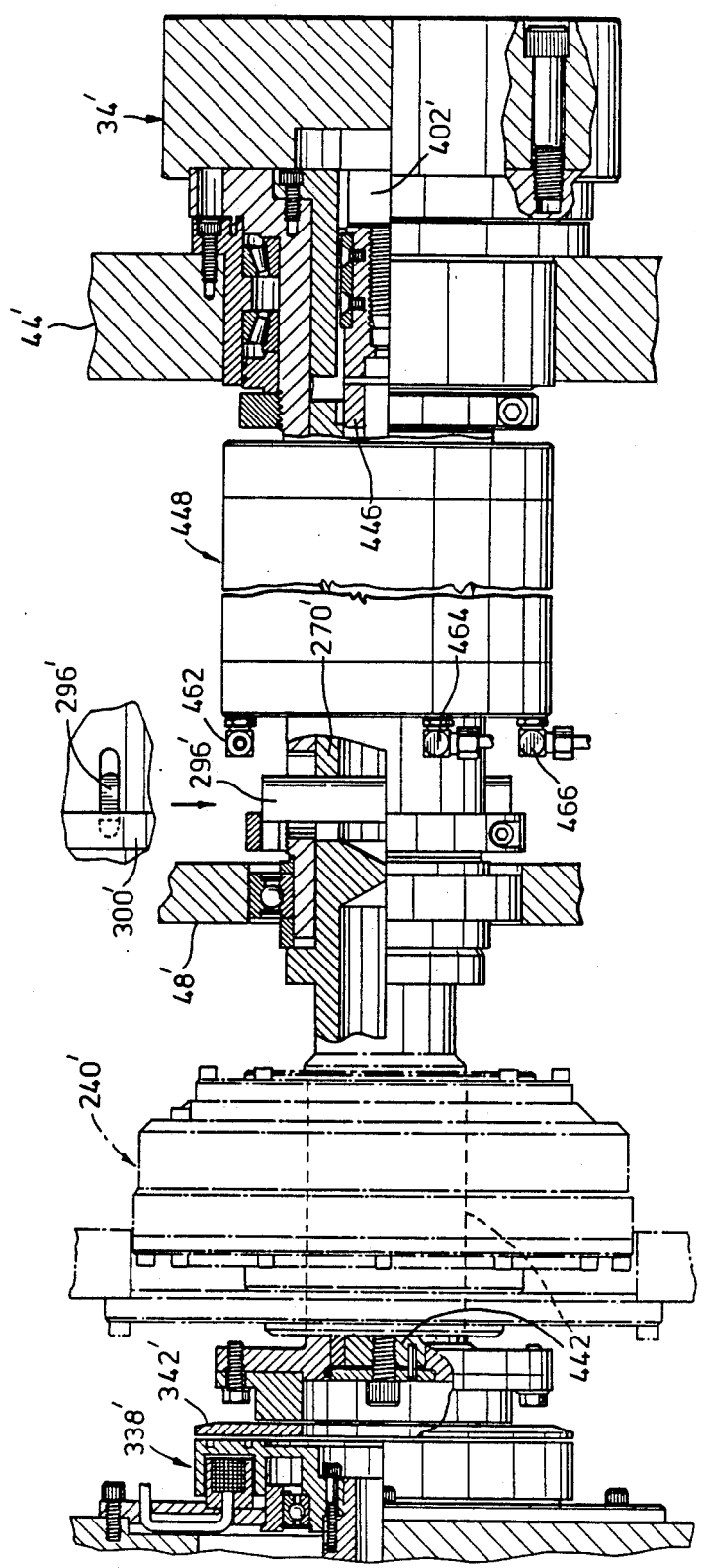

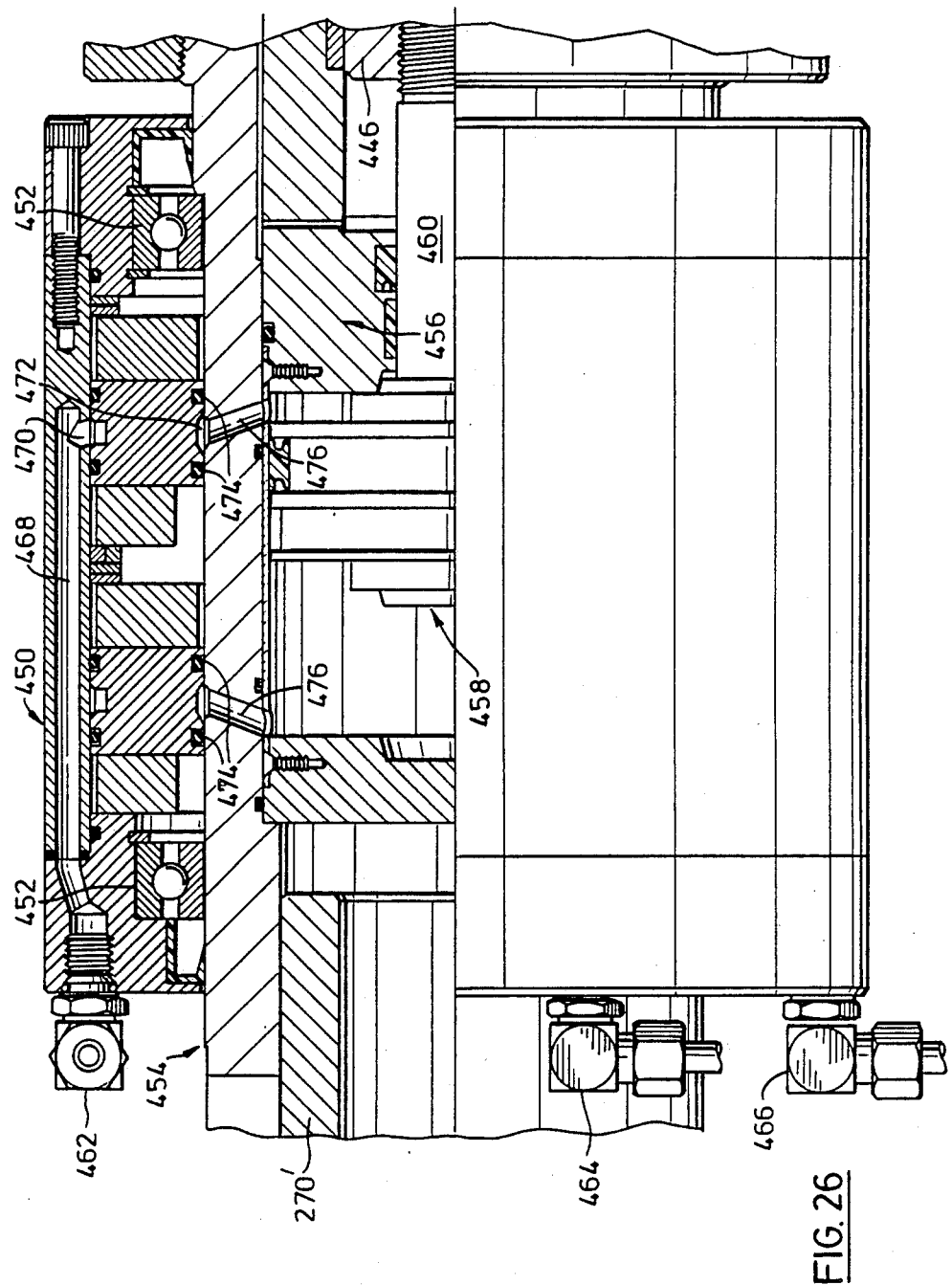

4,771,662

MULTI-SPINDLE CHUCKING MACHINE

CROSS-REFERENCE TO RELATED APPLICATION

This application is a continuation-in-part of application Ser. No. 704,792 filed Feb. 25, 1985 now U.S. Pat. No. 4,665,781.

FIELD OF THE INVENTION

This invention relates generally to machine tools and is concerned more particularly with machine tools of the type known as "multi-spindle chucking machines."

A machine tool of this type includes a series of driven rotary spindles, each provided with a chuck or other device in which a workpiece can be held and presented to a stationary tool for machining. Multi-spindle machines are particularly useful where multiple machining operations are required to be performed on each of a succession of similar workpieces. A typical example of such a requirement is in the manufacture of automotive disc brake rotors, where each of a succession of cast rotor blanks must be machined at different speeds in forming the finished rotor.

DESCRIPTION OF PRIOR ART

A typical prior art multi-spindle chucking machine for use in the manufacture of disc brake rotors includes a series of rotary spindles (typically two or three) mounted parallel to one another in a carrier and each provided at one end with a chuck which protrudes from the carrier for carrying a rotor blank to be machined. The spindles are driven at different but fixed speeds from a single drive motor through a mechanical gear transmission which allows the carrier to be indexed to present each blank to successive tools for machining at different speeds. The carrier is of generally cylindrical shape overall and is supported at its periphery in large diameter annular bearings which encircle the carrier. A splined locking arrangement is provided for retaining the carrier in a position to which it has been indexed.

Prior art machines of this type suffer from a number of disadvantages. For example, the fact that the spindles are driven at fixed speeds restricts the versatility of the machine. In some cases, it would be desirable to be able to vary the machining speed, for example, to take advantage of different cutting tools and/or to be able to accommodate different workpieces, e.g. disc brake rotors for different model cars. The fixed gear transmission arrangements of the prior art make this practically impossible.

Another disadvantage is that the large annular bearings required to support the carrier are extremely expensive. Not only does this make the initial capital cost of the machine high, but maintenance costs are high because the bearings tend to wear out. A related difficulty is that the bearing tolerances must be held to within fine limits because any radial movement of the carrier will have a detrimental effect on the accuracy of machining. These close tolerances in turn make the bearings vulnerable to ambient temperature variations which, in some circumstances, can cause the tolerances to diminish to the point at which the carrier becomes extremely difficult to index. This, in turn, means that high power capacity drives must be used in the indexing mechanism. A still further disadvantage is that the splined locking mechanism conventionally provided for the carrier of prior art multi-spindle chucking machines is extremely costly to manufacture and vulnerable to wear and jamming due to the presence of workpiece chips and other debris inevitably encountered in a production machine shop environment.

An object of the present invention is to provide an improved multi-spindle chucking machine.

BRIEF DESCRIPTION OF THE INVENTION

In one aspect the present invention provides a machine tool which includes a frame and a plurality of spindles each rotatable about an axis and each including a chuck at a first end of the spindle, a driven clutch member at a second end of the spindle, and means intermediate said ends for operating the chuck to respectively engage or release a workpiece to be machined. A carrier supports the spindles in axially parallel positions with the chuck and driven clutch member accessible at respective first and second ends of the carrier and the chuck operating means accessible between the ends. Means is provided supporting the carrier for turning about a longitudinal axis parallel to the spindle axes. Means is also provided for indexing the carrier about the longitudinal axis to move the spindles between defined stations. Locking means acts between the frame and carrier and is operable to lock the carrier with respect to frame in each of a plurality of defined angular positions and precisely locate the spindles at said stations. The carrier support means, indexing means and locking means permit access to the chuck operating means of all of the spindles when the spindles are at said defined stations. The machine also includes spindle drive means supported by the frame adjacent the second end of the carrier and including a number of individual spindle drive motors each disposed in a fixed position aligned with one of said stations. Clutch means is associated with each motor and includes a driving clutch member co-operable with the driven clutch member of a spindle at a relevant said station. The clutch means are operable to drivingly couple each spindle drive motor to the relevant one of the spindles by engagement of the clutch members when the carrier has been indexed to bring that spindle to a said station at which a machining operation is to be performed. The clutch means are disengageable to permit indexing of the carrier.

Preferably, the clutch means may include, in association with at least one of the spindle drive motors, first and second clutches comprising a friction clutch and a toothed clutch, one of which includes a said driven driven clutch member and a co-operable driving clutch member.

The chuck operating means may include a chuck operating member that is disposed within the spindle and is displaceable axially of the spindle to operate the chuck, a piston and cylinder within the spindle connected to the chuck operating member, and means externally of the spindle for delivering hydraulic fluid to the cylinder for displacing the piston to operate the chuck.

In another embodiment, a stationary housing may be mounted externally of the spindle for defining a cylinder and an annular piston may be provided within the cylinder, displaceable axially of the spindle. Means will be provided for delivering hydraulic fluid to the cylinder to displace the piston and the piston will be coupled to the chuck operating member within the spindle. The coupling means may include a shuttle assembly arranged to provide a mechanical advantage in transmitting axial movement of the piston to axial movement of the chuck operating member.

The invention also provides a spindle for use in a machine tool. The spindle is rotatable about a longitudinal axis and includes workpiece holding means in the form of a chuck at a first end of the spindle and a driven clutch member at a second end of the spindle for direct coupling to a driving clutch member coupled to an independent spindle drive motor. A chuck operating member is provided within the spindle and chuck actuating means comprising a piston and cylinder is coupled to the operating member. Means is also provided for delivering hydraulic fluid to the piston and cylinder from externally of the spindle, to operate the chuck. The spindle is made up of first and second axially adjacent parts which are separable from one another and which include respectively the chuck and the driven clutch member. Means is provided releasably coupling the parts of the spindle so as to permit separation thereof. The releaseable coupling means includes a pin which extends transversely through the spindle for transmitting drive from the second spindle part to the first spindle part, and which is removable from externally of the assembled parts for permitting separation thereof.

BRIEF DESCRIPTION OF THE DRAWINGS

In order that the invention may be more clearly understood, reference will now be made to the accompanying drawings which illustrate a number of preferred embodiments of the invention by way of example, and in which:

FIG. 4 is a detail plan view in the direction of arrow 4 in FIG. 3;

FIG. 5 is a sectional view on line 5—5 of FIG. 4;

FIG. 10 is an elevational view, partly in section, showing the drive coupling between a typical one of the drive motors of the machine and a typical spindle transmission, and may be regarded as a continuation of the left hand end of FIG. 8;

FIGS. 11 and 12 are sectional views on lines 11—11 and 12—12 respectively of FIG. 10;

FIGS. 19 and 20 are partial longitudinal sectional views through an alternative form of spindle assembly that may be used in the machine, the assembly being shown in two alternative positions in the respective views;

FIG. 21 is a detail view in the direction of the arrow denoted 21 in FIG. 19;

FIG. 22 is an enlarged detail view of part of the spindle assembly shown in FIGS. 19 and 20;

FIG. 23 is a plan view in the direction of the arrow denoted 23 in FIG. 22;

FIG. 24 is a vertical sectional view on line 24—24 of FIG. 22;

FIG. 25 is a partial longitudinal sectional view through a further alternative form of spindle assembly; and, FIG. 26 is a partial longitudinal sectional view of part of FIG. 25.

FIGS. 1 to 13 and the associated description appear in U.S. Pat. No. 4,665,781 and are reproduced here for completeness.

DESCRIPTION OF THE PREFERRED EMBODIMENTS

Figure 1:
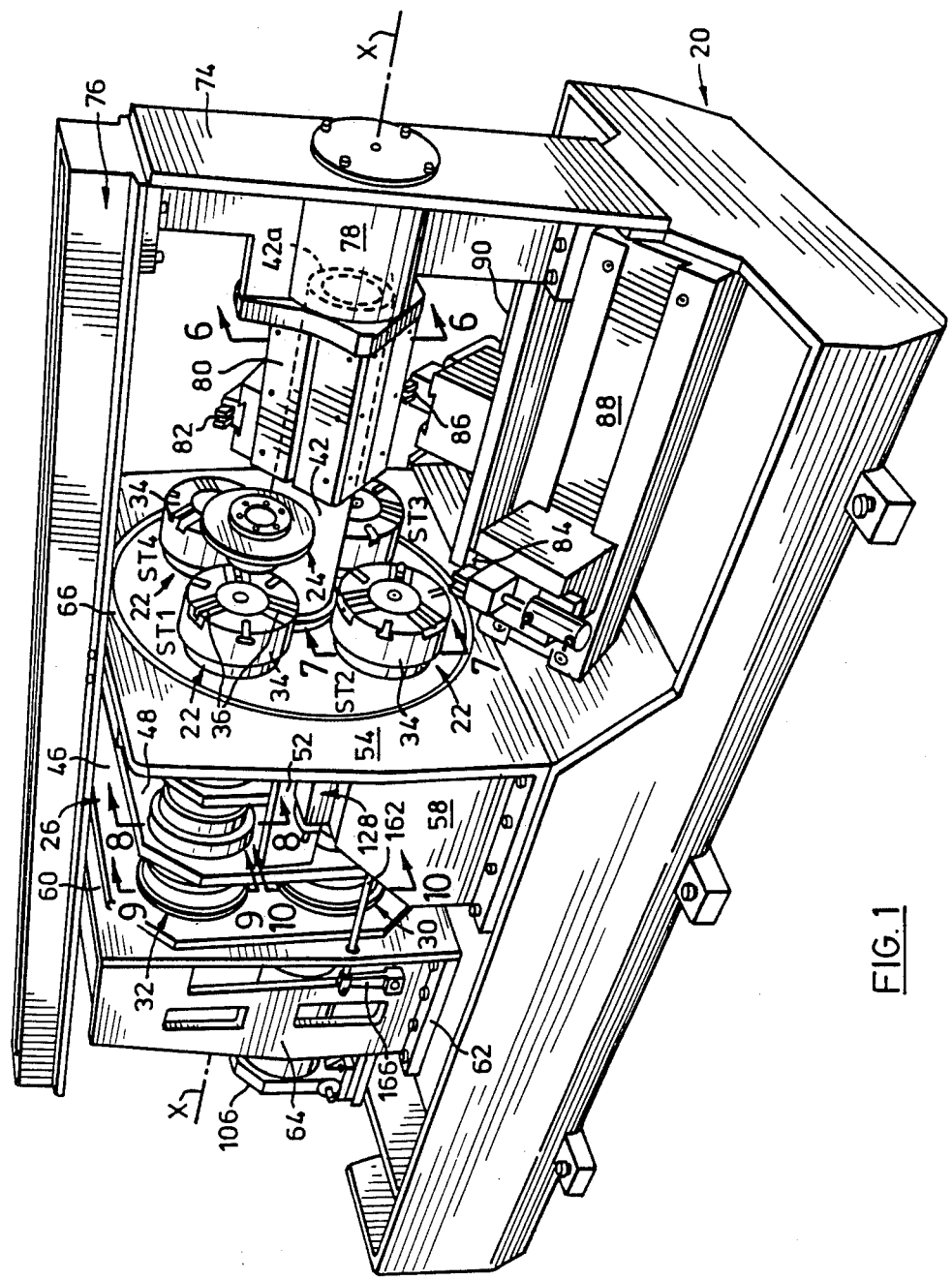
FIG. 1 is a perspective view from one end of a multi-spindle chucking machine in accordance with the invention.
Figure 2:
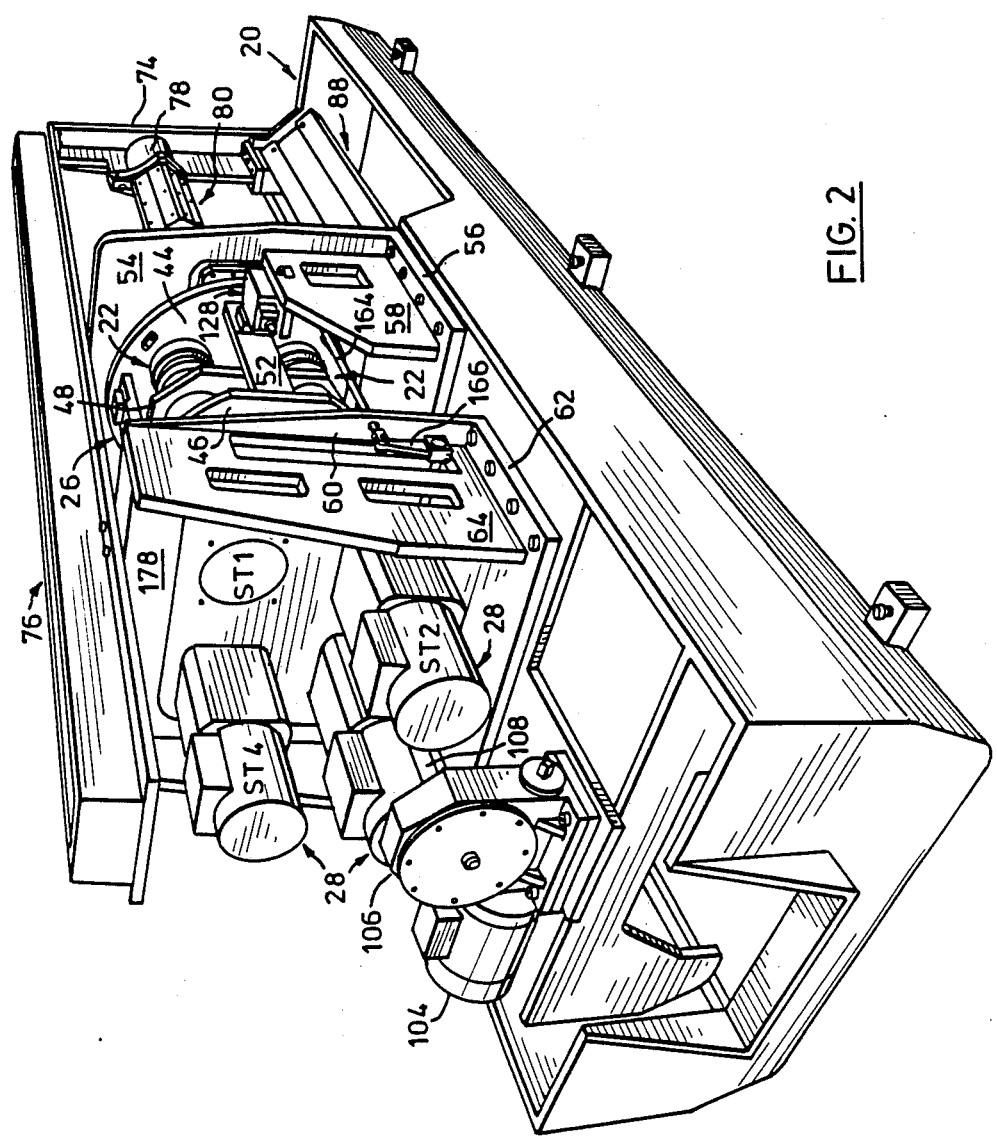
FIG. 2 is a perspective view of the machine shown in FIG. 1, taken from the same side and the opposite end.

Referring to the drawings, FIGS. 1 and 2 may be taken as respectively front and rear perspective views of the machine, in that FIG. 1 best shows the part of the machine at which machining operations will be performed while FIG. 2 shows the opposite end of the machine including the spindle drives and indexing arrangement (all of which will normally be concealed from view by a cover-not shown). The frame of the machine is generally indicated by reference numeral 20 and the spindles (which are largely concealed in those views) are denoted 22. A typical workpiece in the form of a disc brake rotor blank is shown at 24 in FIG. 1, in position preparatory to loading into one of the spindles. A carrier supporting the spindles is denoted 26.

Three spindle drive motors are visible in FIG. 2 and are denoted individually by reference numeral 28. The motors are all identical electric infinitely variable speed motors sold under the trade mark FANUC by Fujitsu of Japan. As best seen in FIG. 1, the machine, in fact, includes four spindles 22 although only three of the spindles are driven at any one time; the first spindle remains stationary for loading while machining operations can be performed on workpieces carried by the other three (driven) spindles. Carrier 26 is indexed (as will be described) to move the spindles successively through four stations (three machining stations and one loading station). For ease of reference, in FIG. 1 the four stations have been marked as ST 1 to ST 4. Station ST 1 is the loading station whereas ST 2 to ST 4 are machining stations.

The four spindles are identical and are indexed successively through all four stations by turning carrier 26. The three spindle drive motors 28 are aligned with the spindles at stations ST 2, ST 3 and ST 4 and are correspondingly marked in FIG. 2. The motors 28 remain stationary as carrier 26 is indexed and electrically operated clutches provide a drive coupling between the three spindles at stations ST 2, ST 3 and ST 4 and the three drive motors 28 during machining. The clutches are deenergized during indexing of carrier 26. The clutches will be described in more detail later. For present purposes, it is sufficient to note that part of one of the clutches at station ST 2 is visible at 30 in FIG. 1 and that similar clutches are provided at stations ST 3 and ST 4. A brake unit 32 is provided for the spindle which is in position ST 1 and is operable to hold that unit stationary for loading and unloading of a workpiece.

Each spindle extends from the position of the relevant clutch (as clutch 30) or brake unit 32 as the case may be to a chuck assembly which is exposed at the right hand end of carrier 26 as it is seen in FIG. 1. The chuck assemblies for all four spindles are essentially identical and are denoted by reference numeral 34. The chucks themselves are essentially conventional hydraulically operated units having guideways 36 on their outer faces for receiving jaws for clamping the workpiece. The jaws have not been shown in FIG. 1 but two typical jaws are shown at 38 in FIG. 7. In view of their essentially conventional form, the chuck assemblies have not been shown in detail. A chuck operating piston is indicated at 40 in FIG. 7 within the spindle and is displaced longitudinally to operate the jaws, as will be described in more detail later.

Figure 3:
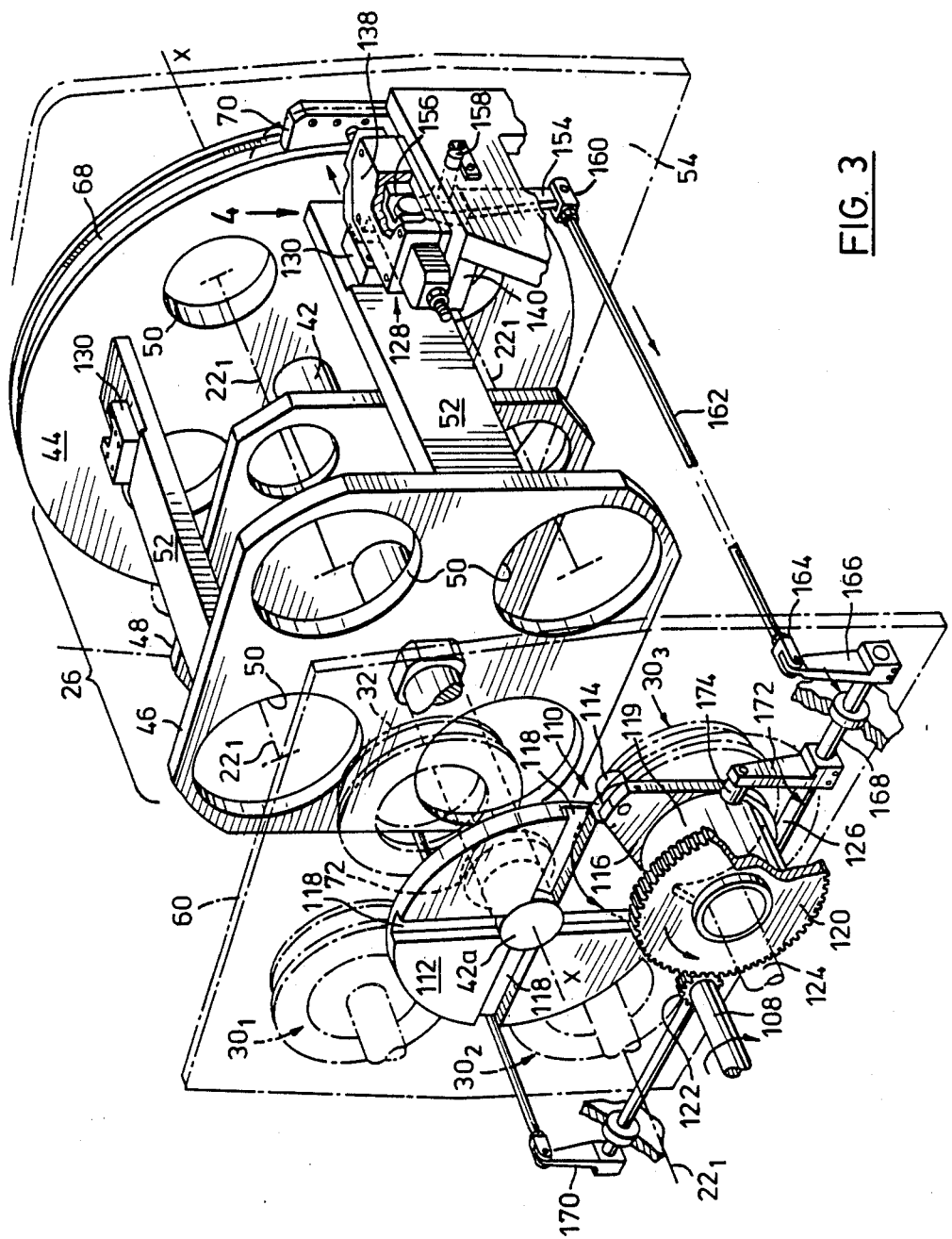
FIG. 3 is a partly exploded perspective view generally of the centre portion of the machine as seen in FIG. 2.
Figure 7:
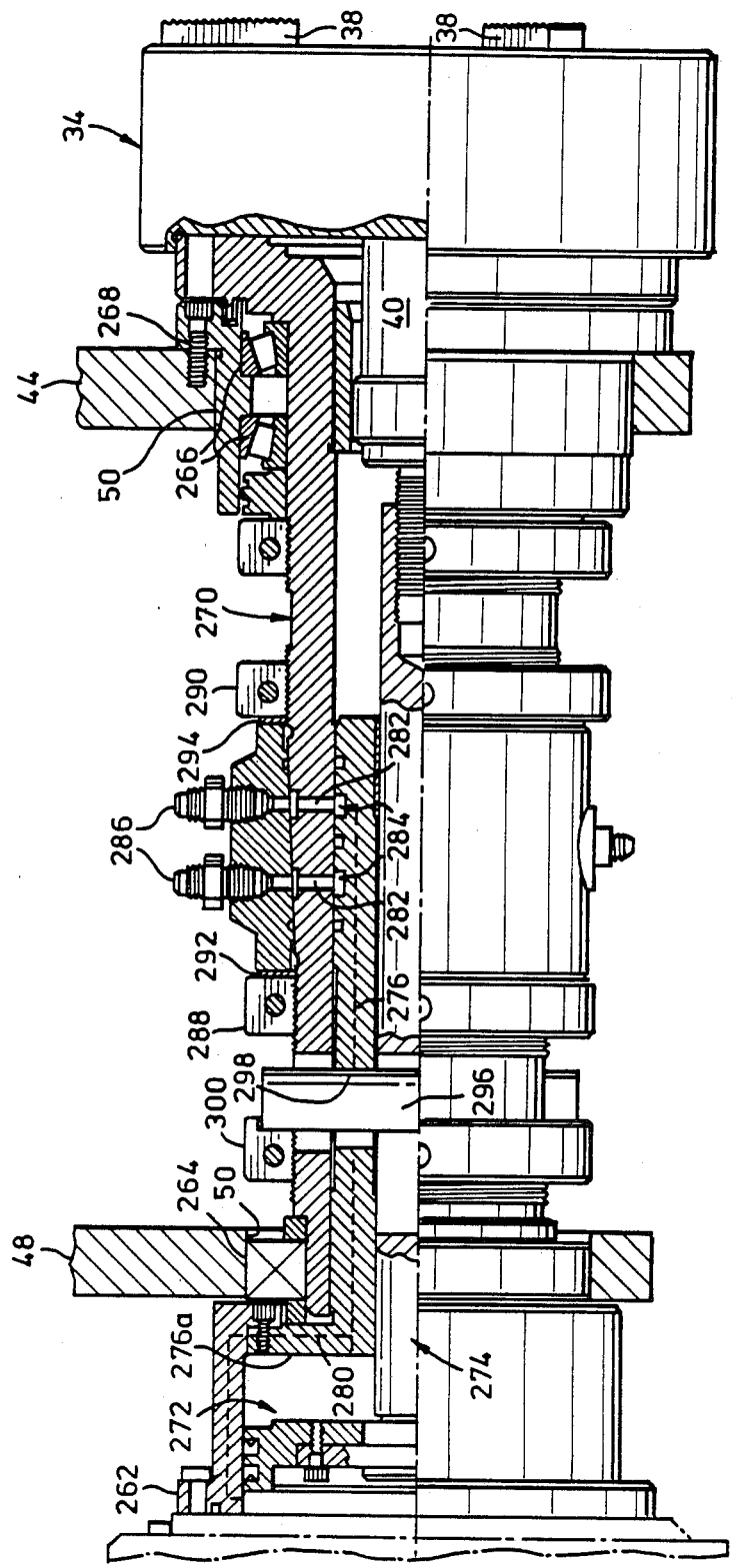

It will be apparent from a review of FIGS. 1 and 7 that the spindles 22 are generally of elongate cylindrical shape overall. The spindles are supported in carrier 26 in axially parallel positions with the chuck assemblies exposed at one end (the "front" end) of the carrier. FIG. 3 shows some detail of the carrier construction; in that view, the spindles themselves have been omitted for clarity of illustration but their rotational axes are indicated by chain dotted lines at $22_1$. The rotational axis of the carrier itself is parallel to the axes $22_1$ and is indicated at X—X in FIGS. 1 and 3.

Carrier 26 includes a central shaft 42 which is disposed on axis X—X and supported in bearings at its ends (see later). In FIG. 3, only part of shaft 42 is in fact visible; the left hand end of the shaft as drawn is indicated at 42a while the shaft extends further to the right than shown. Welded to shaft 42 in planes generally normal to axis X—X are respective first and second carrier end plates 44 and 46, and an intermediate plate 48. These plates are formed with aligned holes, some of which are denoted 50, for receiving the spindles 22. The spindles are secured to the plates 44, 46 and 48 so that the spindles can rotate with respect to the plates. The plates 44, 46 and 48 are maintained parallel to one another by longitudinal bars, two of which are shown at 52 in FIG. 3 although four such bars are in fact provided at positions spaced 90 degrees from one another about axis X—X. The bars 52 are welded to the carrier plates 44, 46 and 48 to form a rigid welded carrier structure.

The plates 46 and 48 are made from square steel plate with the corners removed, while the first end plate 44 is circular. One face of plate 44 is exposed at the front of the machine as best seen in FIG. 1. Plate 44 is located in a circular opening in a further plate 54 which forms part of the frame 20 of the machine. It will be seen from FIG. 1 that plate 54 is in fact welded to a horizontal plate 56 which is bolted to a bed of the machine frame. The two plates 54 and 56 are braced by welded gusset plates, one of which is visible at 58 in FIGS. 1 and 2. A second plate 60 similar to plate 54 is provided at a slight spacing from the rear (left hand) end of carrier 26 as seen in FIG. 1 and is similarly welded to a horizontal plate 62 bolted to the machine bed and braced to plate 60 by two side gussets 64 (see also FIG. 2). Thus, plate 60 essentially forms part of the frame of the machine. This plate rotatably supports the rear end of the main carrier shaft 42 as will be described.

Referring back to FIG. 1, the circular end plate 44 of the carrier is a clearance fit in a complementary circular opening in plate 54. The narrow annular gap between the two plates 44 and 54 is covered by a flexible seal 66 designed to prevent workpiece chips and other debris passing through the gap. As noted previously the machine is provided with a cover which is not shown in FIG. 1. This cover fits around the side and top edges of plate 54 and encloses the parts of a machine behind the plate 54. These parts are accordingly well protected against ingress of debris.

Referring back to FIG. 3, it will be seen that the circular carrier end plate 44 is provided with a peripheral groove 68 rearwardly of plate 54 (plate 54 is shown in ghost outline in FIG. 3). This groove receives a pair of thrust bearing pads at diametrally opposite sides of plate 44, one of which is shown at 70. These pads are adjustably bolted to the rear face of plate 54 and fit closely within groove 68 so as to resist axial thrust imposed on the carrier during machining. It should be noted that these pads do not rotationally support the carrier. The carrier is rotationally supported solely by way of its central shaft 42 as discussed previously.

The left hand (rear) end of shaft 42 as shown in FIG. 3 is supported by the plate 60 which essentially forms part of the machine frame as described above. In FIG. 3, that plate is shown in ghost outline and it will be seen that shaft 42 extends through plate 60 and is supported by a bearing indicated at 72 mounted on the rear side of plate 60 (the side remote from carrier 26). Shaft 42 then extends forwardly through the plates 46, 48 and 44 and projects outwardly from the front face of plate 44 as best seen in FIG. 1. In that view, the front end face of shaft 42 is shown in dotted outline at 42a. This end of the shaft is rotatably supported by bearings in a support column 74 which again forms part of the frame 20 of the machine. Column 74 and the main frame plates 54 and 60 are braced with respect to one another by a horizontal beam 76 which extends longitudinally of the machine from end to end thereof. This form of frame construction imparts great rigidity to the machine which maximizes accuracy of machining.

In any event, referring back to shaft 42, FIG. 6 shows the front end portion of shaft 42 in section and illustrates the manner in which the shaft is rotationally coupled to column 74. It will be seen from FIGS. 1 and 6 that the column is shaped to provide a hub 78 into which shaft 42 extends. Adjacent hub 78, shaft 42 also passes through a tool rest 80 for supporting stationary cutting tools such as the tool shown at 82 in FIG. 1. Other tools are shown at 84 and 86 supported upon tool holders 88 and 90 carried by the frame of the machine. The tools shown are for illustration purposes only and are not intended to be accurate representations of actual tools. Conventional tools and tool actuating devices will be used to position and feed the tools into workpieces carried by the spindles.

Figure 6:
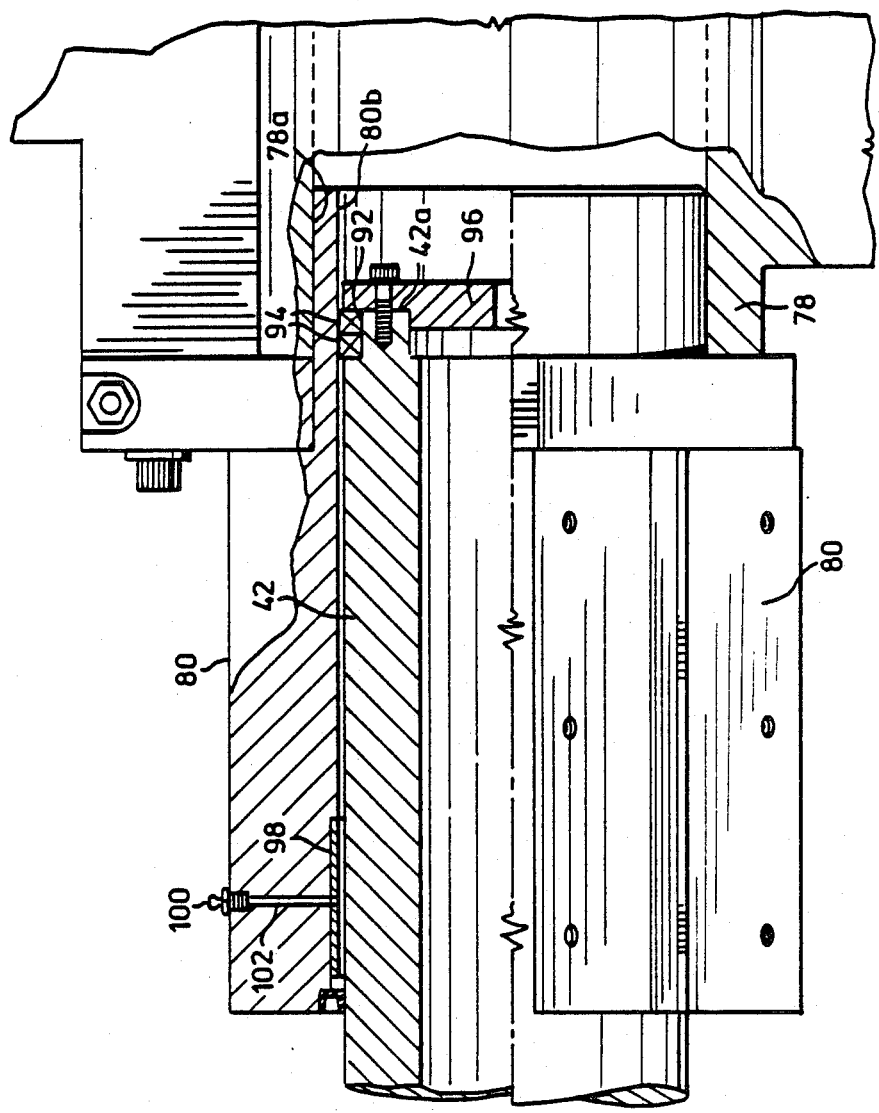
FIGS. 6 and 7 are sectional views on line 6—6 and 7—7 respectively of FIG. 1.

Returning to a consideration of FIG. 6, tool holder 80 is formed with a cylindrical projection 80a at its end adjacent the support column hub 78 and this projection is received in a complementary recess 78a in hub 78. Tool rest 80 has an internal bore 80b which receives the shaft 42. At its extreme forward end 42a, shaft 42 is provided with an annular rebate 92, which receives a pair of roller bearings 94 arranged to ride on the internal surface of bore 80b. A bearing retainer 96 is bolted to the end of shaft 42.

Adjacent its opposite end, the tool rest 80 is supported on shaft 42 by way of a bushing 98 and a grease nipple 100 and corresponding bore 102 are provided for lubricating the interface between shaft 42 and tool rest 80.

In this way, the forward end of shaft 42 is rotationally supported by relatively small diameter bearings without the need for the large and costly annular bearings of the prior art. At its opposite end shaft 42 is similarly supported by the relatively small diameter bearing 72 on frame plate 60 of the machine. In summary, the carrier is supported solely by its main central shaft 42, which shaft is carried at ends in bearings supported from the frame of the machine.

Indexing of carrier 26 is accomplished by a Geneva cam mechanism driven from a motor drive at the rear of the machine. Referring to FIG. 2, the carrier indexing drive motor is an electric motor denoted 104 which is coupled to a worm drive gear box 106 having an output shaft 108 extending generally longitudinally of the machine. Shaft 108 is also shown at the left hand end of FIG. 3. Drive is transmitted from shaft 108 to the main central shaft 42 of the carrier by way of a Geneva cam mechanism 110. This mechanism includes a hub 112 which is secured to the rear end portion of shaft 42 and a cam follower 114 carried by an arm 116. Follower 114 engages successively in each of four radial cam tracks 118 in the rear face of hub 112. Follower 114 circulates continuously (while motor 104 is operating) in a circular path indicated at 114a in FIG. 3. If motor 104 continues to operate, cam follower 114 will successively enter each of the tracks 118 and will intermittently turn hub 112 and with it, the carrier 26 through a 90 degree increment as follower 114 moves along the relevant track and displaces hub 112 clockwise as drawn. The arm 116 which carries the cam follower 114 is coupled by a collar 119 to a spur gear 120 which meshes with a smaller gear 122 on the drive shaft 108 from motor 104. Motor 104 will of course be controlled by the control system of the machine to index the carrier in accordance with the particular sequence of operations required of the machine.

The Geneva cam follower assembly 114, 116 and its driving gear 120 are mounted co-axially on a shaft indicated in ghost outline at 124 which is driven by the spindle drive motor 28 at station ST 2 as will be described later. The arrangement is such that the gear 120 and the cam follower assembly 114, 116 can turn independently of shaft 124. Also mounted on arm 116 to turn about the axis of shaft 124 is an arcuate cam segment 126 which is used to operate mechanisms for latching the carrier in a position to which it has been indexed. One of these latching mechanisms is generally denoted by reference numeral 128 in FIG. 3 and an identical mechanism is provided at the opposite side of the carrier but is not visible in FIG. 3. The latching mechanisms 128 cooperate with latch blocks 130 mounted one on each of the four longitudinal bars 52 of the carrier structure. In FIG. 3, mechanism 128 is shown engaged with one of these latch blocks 130 and a similar latch block is shown on the bar 52 which appears at the top in FIG. 3. Details of mechanism 128 and a typical one of the latch blocks are shown in FIGS. 4 and 5.

Referring first to FIG. 5, it will be seen that the latch block 130 has a slot 132 in one face and that one lateral wall of the slot is bevelled as indicated at 132a. A latch bolt 134, part of which is visible in FIG. 5, is shaped to engage in slot 132 and has a corresponding bevel; bolt 134 is dimensioned to wedge into the slot before becoming fully seated therein. Latch bolt 134 extends laterally from a slide member 136 (FIG. 4) mounted to slide longitudinally in a housing 138 bolted to the frame of the machine. Referring back to FIG. 3, it will be seen that this is accomplished by bolting housing 138 to a lateral "shelf" 140 carried by one of the gusset plates 58 referred to above.

A helical compression spring 142 is located in a bore 144 in member 136 and acts between the head of an adjustment bolt 146 which is threaded into an opening in one end of member 136 and projects outwardly therefrom, and a plunger 148 at the opposite end of bore 144. Plunger 148 is a free sliding fit in bore 144 and bears against the thrust pad 70 of the carrier (see FIG. 3).

FIG. 4 shows the latching mechanism in the position in which carrier 26 has been latched and is held stationary as for machining. Spring 142 is calibrated to hold the latch bolt 134 in engagement with the latch block at this time. Unlatching is effected by displacing slide member 136 to the right in FIG. 4, thereby effectively compressing spring 142, which consequently provides a spring biased latching force. Bolt 146 is adjustable to vary the spring biasing effect and is provided with a lock nut 152.

This unlatching movement of member 136 to the right in FIG. 4 is effected automatically from the cam follower segment 126 referred to previously and discussed in connection with FIG. 3. Referring back to that view, a latch release lever 154 extends upwardly into the latching mechanism and is received at its upper end in a recess 156 in slide member 136 (recess 156 is also shown in FIG. 4). Lever 154 is pivoted on a pivot shaft 158. At its lower end, lever 154 is fitted with a yoke 160 coupled to a pull rod 162 which extends rearwardly of the machine and which is coupled at its rearward end by a further yoke 164 to the upper end of a lever 166. That lever is itself carried by a cross shaft 168 which extends to the far side of the machine as seen in FIG. 3, where it is provided with asimilar lever 170 for operating the latching mechanism at the other side of carrier 26.

Adjacent cam segment 126, shaft 168 carries with a further lever 172 which supports a cam follower 174 arranged to engage the cam segment 126. Thus, when follower 174 rides up segment 126, all three levers 172, 166 and 170 will pivot so that their upper ends move rearwardly, exerting a pull on the pull rod 162 and on the corresponding rod at the opposite side of the machine, and releasing both latch mechanisms. Cam segment 126 is positioned to release the latch mechanisms just before the Geneva cam follower 116 enters the Geneva hub cam track 118 and begins to rotate the carrier. Conversely, after carrier indexing has been completed, follower 174 will leave the cam segment 126 and the latch mechanisms will re-engage by virtue of their internal spring biasing. The bevels 132a in the latch block slot and the corresponding bevel on the latch bolt will ensure positive location of the carrier even if some initial misalignment should occur.

Reference will now be made to FIGS. 7 to 12 in describing a typical one of the spindles 22 of the machine and the manner in which the spindles are driven at positions ST 2, 3 and 4 of the machine.

Figure 8:
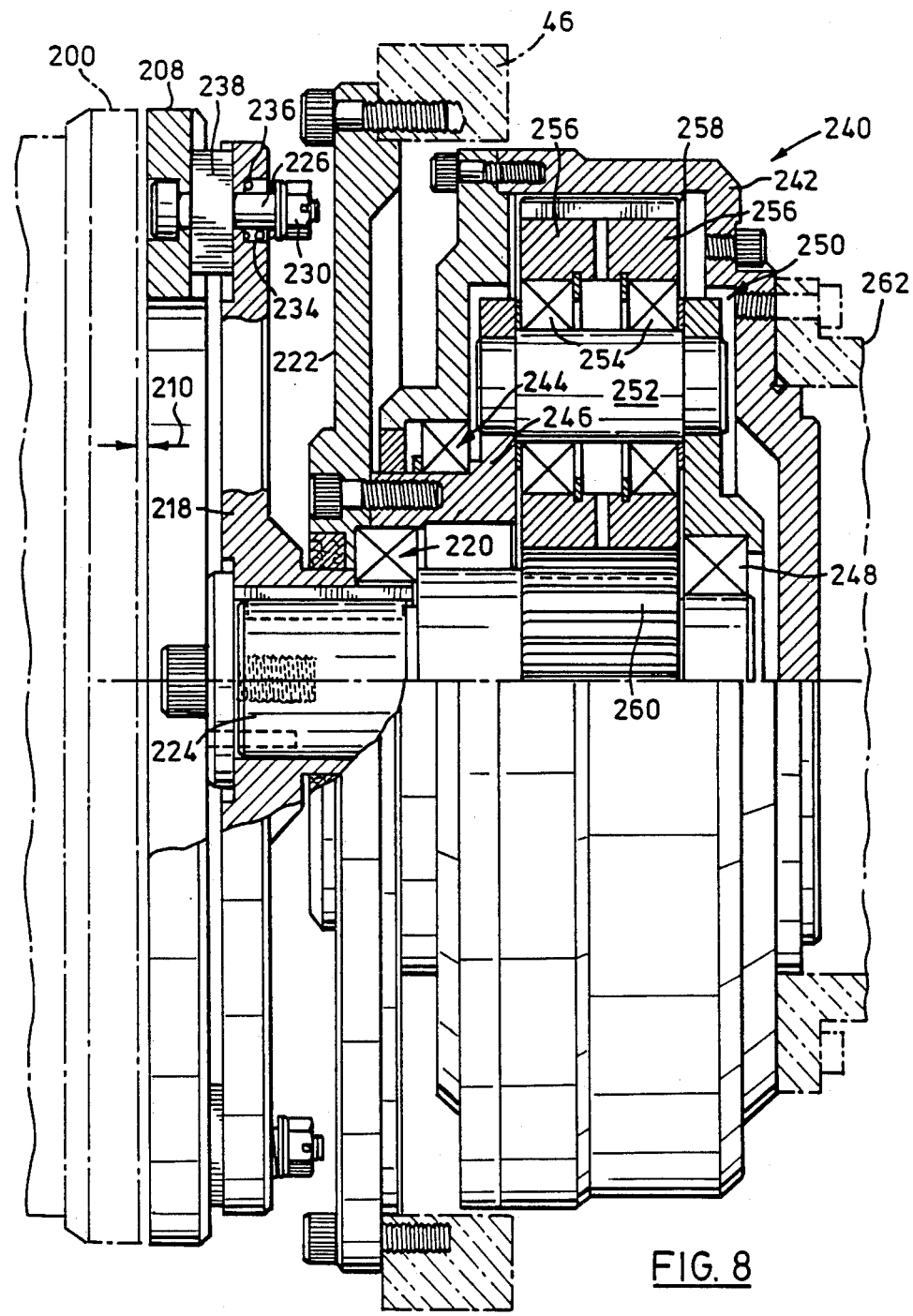
FIG. 8 is a vertical sectional view through part of the drive transmission in a typical one of the spindles of the machine and may be considered as an extension of the left hand end of FIG. 7.
Figure 9:
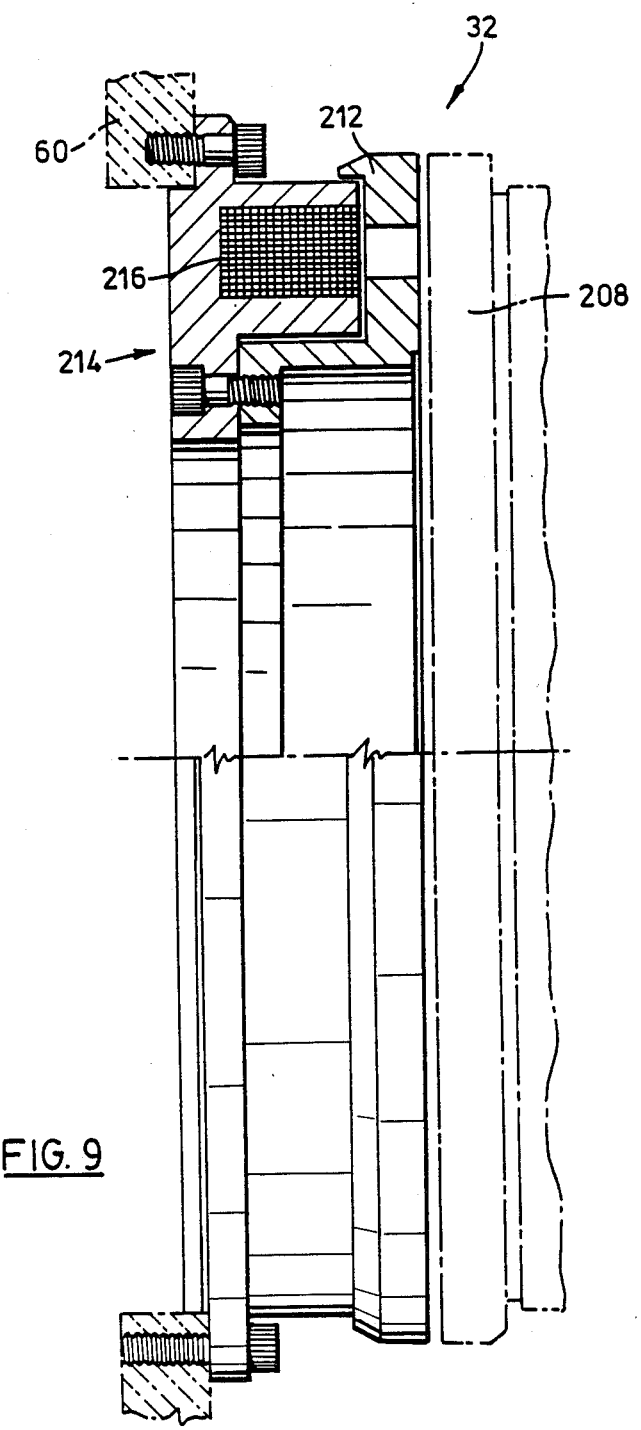
FIG. 9 is a sectional view on line 9—9 of FIG. 1.

For clarity of illustration, various parts of the spindle 22 are shown in different views of the drawings. FIG. 7 shows the main body of the spindle. FIG. 8 shows a transmission arrangement which is incorporated in the spindle and may be considered as a continuation of the left hand end of FIG. 7; part of a typical one of the clutches (as clutch 30) is also shown in ghost outline in FIG. 8, FIG. 9 shows the brake 32 used at position ST 1. FIG. 10 shows the coupling between one of the clutches (as clutch 30) and a typical one of a spindle drive motors 28. FIGS. 11 and 12 show details of FIG. 10.

As noted previously, the machine includes three clutches disposed at the positions of stations ST 2, ST 3 and ST 4 respectively and one brake at the position of station ST 1. In FIG. 3 the three clutches and the brake are shown in ghost outline in the positions they would occupy in practice. The brake is denoted 32 and the three clutches are denoted respectively $30_1$, $30_2$ and $30_3$. Each clutch is shown having an associated drive shaft from the relevant spindle motor 28. One of these shafts is the shaft 124 referred to previously as supporting the Geneva cam follower of 116, its drive gear 120 and the intervening collar 119. These latter components are shown in ghost outline in FIG. 10 and it will be seen from that view that the shaft referred to as shaft 124 in FIG. 3, in fact, comprises a shaft assembly providing means for coupling the relevant spindle drive motor 28 to the associated clutch 30. It will, of course, be understood that arm 116, collar 119 and gear 120 appear only at position ST 2 (see FIG. 3) although the shaft assembly 124 may be considered to be typical of the shaft assemblies associated with each of the three drive motors 28 and the associated clutches 30.

Referring first to FIG. 10, it will be seen that clutch 30 is bolted to the vertical plate 60 discussed above which essentially forms part of the frame of the machine. Two typical attachment bolts are shown as 176 in FIG. 10. A second vertical plate denoted 178 extends parallel to plate 60 between the side plates 64 (see FIGS. 1 and 2). As best seen in FIG. 2, plate 178 carries the spindle drive motors 28. The motors are secured to the plate by bolts (not shown). Referring back to FIG. 10, part of a typical one of the drive motors is shown at 28 in position adjacent plate 178. A motor drive shaft 180 extends forwardly through an opening in plate 178 and is shown in dotted outline at in FIG. 10. An inner portion 182a of a drive transmitting sleeve 182 encloses the motor drive shaft 180 and is keyed thereto as indicated at 186. The sleeve also includes an outer portion 182b shaped to define a part of lugs 182c (FIG. 11) which key to an input shaft 188 of clutch 30.

Intermediate the sleeve portions 182a and 182b, transverse slots are cut in the sleeve leaving a pair of lands 182d, as best seen in FIG. 12. An end cap 192 fits between these lands and is secured to the end face of the motor drive shaft 180 by bolts 194. Shaft assembly 124 is housed within a sleeve indicated in ghost outline at 196 which extends between and is received at its ends in openings in the plates 60 and 178 respectively. Sleeve 196 rotationally supports the Geneva cam follower arm 116, the spur gear 120, and the intermediate sleeve 119 by way of bearings 198. Spacers 199 locate these components between plates 60 and 178.

Each of the clutches 30 and the brake 32 is essentially a conventional electromagnetic unit. In FIG. 10, a driving plate of clutch 30 is denoted 200 and is coupled to the clutch input shaft 188 and rotationally supported with respect to a stationary part 202 of the clutch by bearings 204. Part 202 is bolted to plate 60 to plate 60 by the bolts 176 mentioned previously. An electromagnetic coil in stationary part 202 is shown at 206. A driven clutch plate shown in ghost outline at 208 in FIG. 10 is carried at the rear end of each of the spindles 22. The two plates 200 and 208 and the carrier 26 are designed so that, the carrier is indexed, the driven clutch plates 208 carried by the respective spindles move exactly parallel to one another, to the outer faces of the clutch driving plates (as plate 200) and to the corresponding plate of brake 32, so that a very narrow clearance gap 210 exists between the opposing faces of the respective clutch plates when the clutch is in its de-energized state. When the clutch is energized, the magnetic field generated within the stationary part 202 of the clutch draws the driven clutch plate 208 into tight driving engagement with the plate 200 so the drive is transmitted to the spindle.

Brake 32 (FIG. 9) operates in essentially the same fashion except in that the equivalent of the driving clutch plate 200 of FIG. 10 is stationary and there is no motor and shaft assembly associated with the brake. The equivalent of the clutch driving plate 200 is denoted 212 in FIG. 9 and comprises a generally annular plate bolted to a stationary component 214 of the clutch which is itself bolted to the plate 60 carried by the machine frame. An electromagnetic coil housed within component 214 is shown at 216. When the brake is energized, a magnetic field is produced which draws the driven plate 208 of the relevant spindle tightly against the plate 212 of the brake in essentially similar fashion to the way in clutch 30, except that the spindle plate 208 is held stationary instead of being driven.

FIG. 8 shows the driven spindle plate 208 (hereinafter called a clutch plate) partly in section and positioned at a spacing 210 from the end face of a plate which is denoted 200 in FIG. 8 to represent the clutch plate 200 of FIG. 10 but which may, in fact, be part of the brake 32 depending on which of the machine operating stations is being considered. Plate 208 is supported by a backing plate 218 which in itself rotationally supported by a bearing 220 with respect to the carrier rearend plate, part of which is indicated at 46 in FIG. 8. The outer race of bearing 220 is, in fact, carried by a fixed plate 222 which is bolted to carried end plate 46. The backing plate 218 is keyed to a central shaft 224 carried by the inner race of bearing 220.

Clutch plate 208 is supported with respect to the backing plate 218 by a series of bolts which are spaced around the peripheries of the respective plates and two of which are indicated at 226 and 228 in FIG. 8. Bolt 226, which may be taken as typical of all the bolts, extends forward (of the machine) from plate 208 through an opening in plate 218 and is fitted at its forward end with a nut 230 backed by a washer 232 and a helical compression spring 234 which acts between the washer 232 and the bottom of a recess 236 in plate 218. A spacer 238 carried by bolt 226 maintains a minimum spacing between the backing plate 218 and the clutch driven plate 208 but the springs, as spring 236, allow the plate 208 to move towards plate 200 (or plate 212), closing gap 210, when the clutch or brake as the case may be is operated. At the same time, the springs (as spring 236) provide a biasing force for retracting plate 208 and providing the required clearance 210 when the clutch or brake is deenergized.

In the illustrated embodiment, each of the spindles 22 incorporates a planetary gear-type transmission designed to "gear down" the speed of the motor so that the chuck of each spindle rotates at a speed less than the motor speed. In the particular application for which the machine being described was designed, it is desirable to maintain the speed of the drive motors at a relatively high speed (e.g. above 1200 RPM) to avoid loss in power when slow spindle machine speeds are required.

In FIG. 8, the transmission is generally denoted by reference numeral 240 and includes a generally drum-shaped casing 242 which rotates when the transmission is in operation and which is rotationally supported with respect to the carrier 46 by a bearing 244 running on a stationary planet gear carrier 246. As can be seen, carrier 246 is bolted to the fixed plate 222 supported by the carrier end plate 46. Carrier 246 is also rotationally supported with respect to the central shaft 224 by a further bearing 248. One of a series of three planet gears supported by carrier 246 is denoted 250. Gear 250 includes a stationary central shaft 252 which carries bearings 254 supporting a pair of gear wheels 256 which mesh both with an internal gear 258 inside casing 242 and an external gear 260 on shaft 224.

When the relevant spindle is engaged with one of the clutches 30, the clutch is energized and the associated drive motor is operating, drive is transmitted through the clutch to the clutch backing plate 218 which rotates and turns shaft 224. The shaft 252 of the planet gears 250 are stationary so that, as shaft 224 turns, the planet gears turn on their stationary shafts and transmit drive to the casing 242 of the transmission, which also turns. Shown in ghost outline at 262 is a part of the forward section of the spindle; part 262 is bolted to casing 242 and accordingly turns with the transmission casing. Part 262 is also visible in FIG. 7, which will now be described.

In FIG. 7, the chuck 34 of the spindle is shown at the right hand (forward) spindle end as discussed previously. Also shown are carrier end plate 44 and intermediate plate 48. The spindle is fitted into the openings 50 (FIG. 3) in these plates by a single bearing 264 in the case of plate 48 and by a pair of oppositely directed taper roller bearings 266 in the case of plate 44. This latter roller bearing arrangement assures axial positioning of the spindle. The outer races of the bearing 266 are carried by a support 268 which is bolted to carrier plate 44. The inner races of those bearings support a main cylindrical body member 270 of the spindle which rotates while the spindle is in use. That member 270 also carries the inner race of bearing 264 at the position of plate 48. At its rearward end, member 270 is coupled to the spindle part 262 which is bolted to the transmission casing as discussed previously.

Part 262 is shaped to form a cylinder for a piston 272 used to operate the jaws of the chuck 34. Piston 272 is carried at one end of a piston rod 274 which extends longitudinally through the main spindle body 270 to the chuck operating piston 40 (discussed above) and which is in turn coupled to the jaws of the chuck. Piston rod 274 slides within a sleeve member 276 which is disposed inside the main spindle body member 270 and which has a flange 272a at its rearward end. Flange 276a is secured by screws, one of which is indicated at 278, to spindle part 262.

Hydraulic oil is delivered opposite sides of piston 272 for displacing the piston through passageways 280 in cylinder member 276 and part 262. Those passageways communicate with passageways 282 through the main spindle body member 270 and open into circumferential grooves 284 in that member. A bronze bush 286 encircles the body member 270 at the positions of these grooves and is fitted with hydraulic hose couplings 286. This member remains stationary while the spindle is rotating and is located axially by a pair of split nuts 288, 290 which encircle the body member 270 and are threaded onto the member. Bearing pads 292 and 294 are provided at opposite ends of the bush.

Sleeve member 276 couples spindle part 262 and spindle body member 270 by way of a pin 296 which extends diametrically through body members 270 and 276 and protrudes from both sides of the main body member. A clearance opening in piston rod 274 allows reciprocation thereof without contacting pin 296. At one side, the pin bears against an edge 298 of an opening in a cylinder member 276; its other side, its pin is contacted by a split nut 300 which is similar to the nuts 288 and 290 and which is threaded on to the main body member. When disassembly of the spindle is required, nut 300 is slackened, allowing pin 296 to be removed, which then allows the cylinder member 276 to be withdrawn from within body member 270 to the left in FIG. 7.

Figure 13:
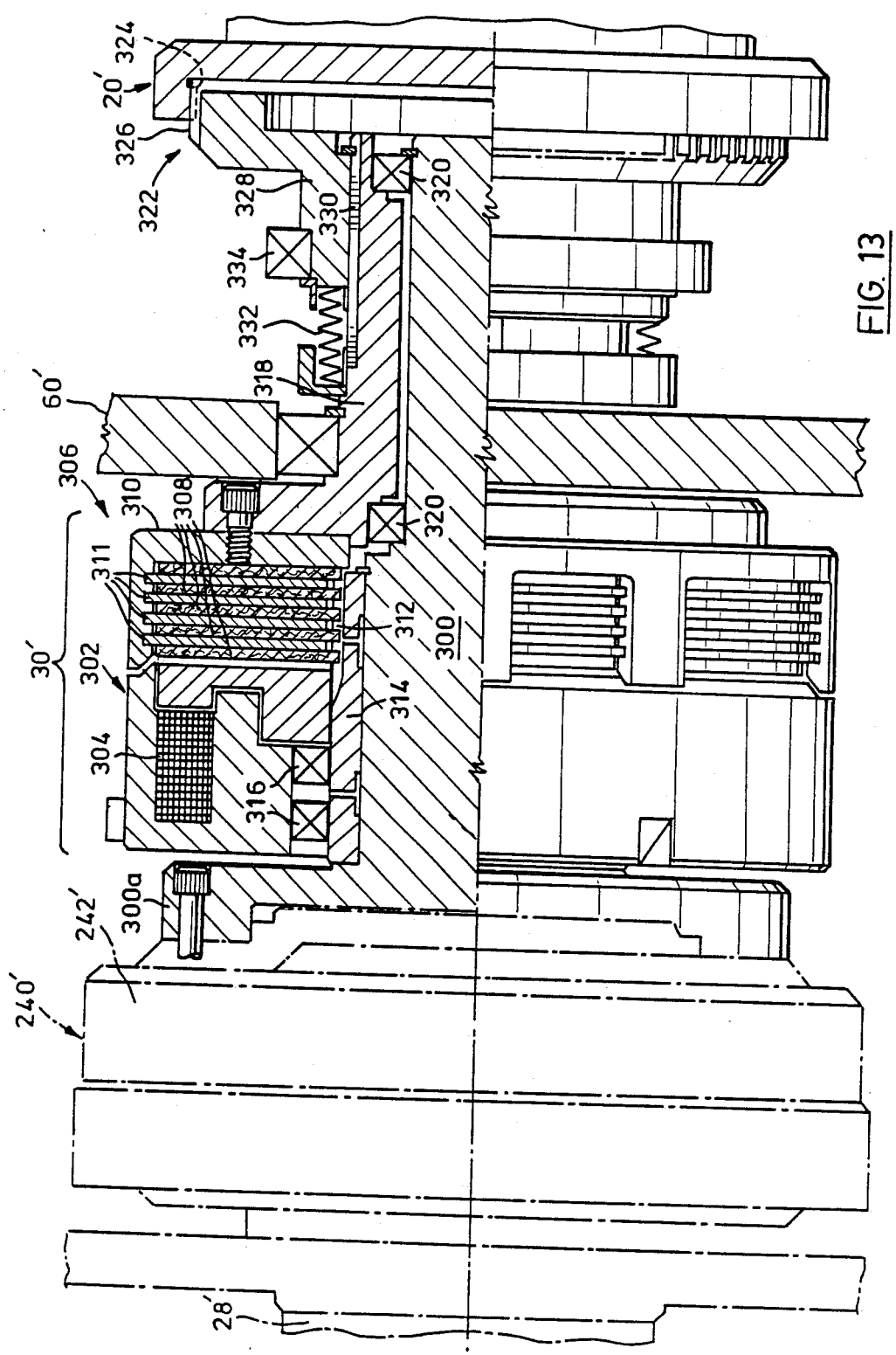
FIG. 13 is an elevational view, partly in section, of an alternative form of spindle drive arrangement.

FIG. 13 illustrates an alternative form of spindle drive arrangement that may be used in place of the drive arrangement discussed previously. In FIG. 13, primed reference numerals have been used to denote parts which correspond with parts shown in previous use.

The drive arrangement shown in FIG. 13 is designed for use primarily in applications in which extraordinarily high torque loads are generated. To accommodate these loads, a multi-plate clutch is employed in place of the single plate clutch previously described. In addition, the transmission between each drive motor and the associated chuck is coupled directly to the drive motor instead of being incorporated in the spindle as in the previous embodiment. This allows a larger and more robust transmission to be constructed than is possible where the transmission has to be incorporated within the spindle.

Referring now more specifically to FIG. 13, the multi-plate clutch is generally denoted by reference numeral 30' and is shown positioned between a drive motor, part of which is shown in ghost outline and denoted 28', and a spindle of the machine, part of which is denoted 20'. The spindle itself is the same as the spindle described previously except in that the drive transmission 240 (see e.g. FIG. 8) has been omitted from the spindle and, in effect, re-positioned between the drive motor 28' and the multi-plate clutch 30'. In FIG. 13, the transmission is shown in ghost outline at 240' and is essentially the same as the transmission described previously except for its location. Thus, an input shaft of the transmission is driven by an output shaft of motor 28', neither of which are shown, and the transmission has a casing 242' which it rotates at a speed related to the drive motor output shaft speed when the motor is in operation.

A transmission shaft 300 transmits drive from transmission 240' and is coupled to the transmission casing 242' by way of a flange 300a which is bolted to the casing. Clutch 30' includes a stationary part 302 which is coupled to the frame of the machine (not shown) and which includes a coil 304, and a movable part 306 which includes a series of annular clutch plates disposed parallel to one another within a housing 310. Alternate ones of those plates, denoted 308, are coupled to the central shaft 300 by a spline arrangement generally indicated at 312 and including a sleeve 314 secured to shaft 300, while the intervening plates 311 are coupled to housing 310. Bearings 316 rotationally support the stationary clutch part 302 on sleeve 314. Thus, the plates 308 rotate with the shaft 300 when the motor 28' is running, while the intervening clutch plates 311 and the housing 310 remain stationary. When the coil 304 is energized the clutch plates 308 and 311 and housing 310 are drawn together and all rotate with the shaft 300.

Housing 310 is itself coupled to a further sleeve 318 which rotates on shaft 300 by way of bearings 320. A secondary, toothed clutch arrangement generally indicated at 322 is then provided for coupling sleeve 318 to the spindle 20'. This clutch arrangement includes an annular internally toothed gear 324 on spindle 20 and a complimentarily externally toothed gear 326 on the clutch member 328. Member 328 is coupled to sleeve 318 by splines 330 which allow the clutch member 328 to slide in the axial direction of shaft 300 to engage or disengage the teeth 324 and 326. Clutch member 328 is biased by springs 332 to normally maintain such engagement but the clutch member can be retracted against its spring biassing by an actuator (not shown) to disengage the transmission from the spindle and permit the carrier of the machine to be indexed at appropriate times. The actuator for the secondary clutch engages behind a bearing 334 on clutch member 328 and is coupled to the rod 162 for the carrier latching mechanism (best seen in FIG. 3). Thus, the actuator is arranged to release the secondary clutch 322 when the carrier latches are released and to permit the clutch to engage when the latches are engaged.

In this particular embodiment, clutch 30' is a Siemens stationary field multiple disc clutch available from Siemens AG of West Germany.

Reference will now be made to FIGS. 14 to 18 in describing other alternative forms of clutch assembly that may be used in the machine described previously. Primed reference numerals are used in these views to denote parts that correspond with parts shown in previous views. As in the embodiment of FIG. 13, the embodiments to be described all employ a toothed clutch in combination with a friction clutch and are designed for use primarily in applications in which extraordinarily high torque loads are generated during machining. Also as in FIG. 13, the drive transmission is preferably coupled directly to the drive motor although this is not essential.

Figure 14:
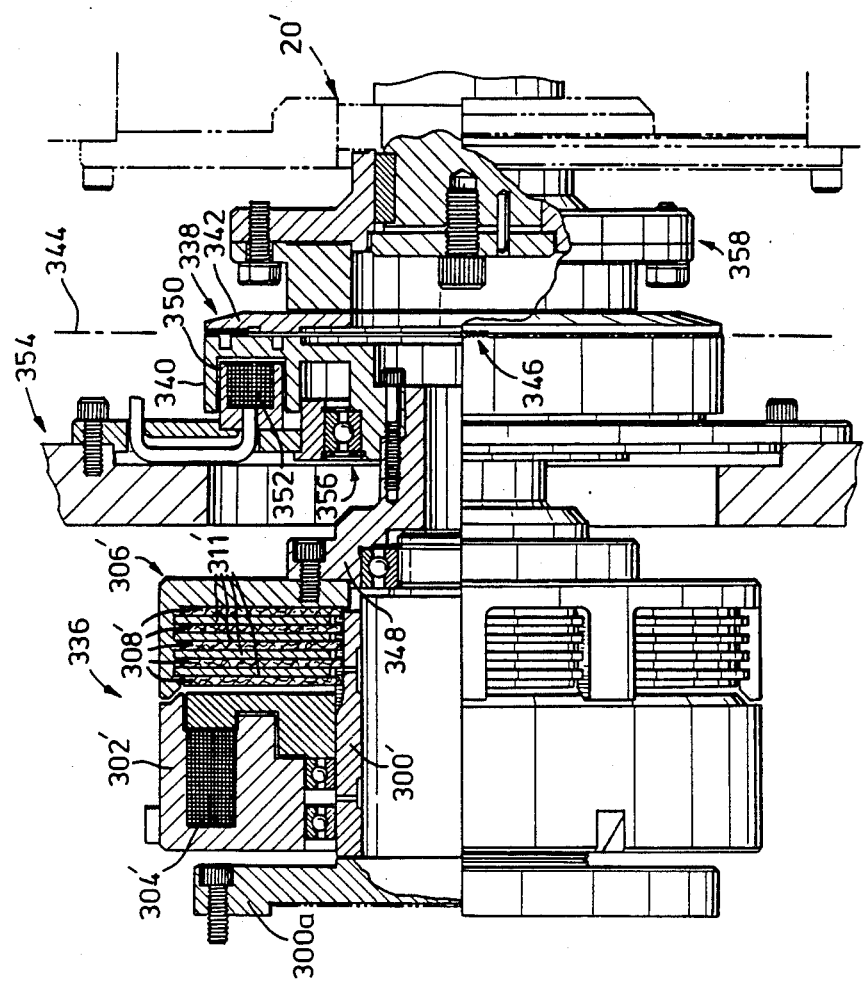
FIGS. 14, 15 and 17 are partial longitudinal sectional views similar to FIG. 13 illustrating three alternative forms of clutch arrangement that may be employed in the machine.

Referring first to FIG. 14, the friction clutch is generally denoted by reference numeral 336 and the toothed clutch by numeral 338. Clutch 336 has a stationary part 302' which has as a coil 304' and a movable part 306' that houses the clutch discs 308' and 311'. Alternate ones of the disc are splined to a central drive transmission shaft 300' while the intervening discs are connected to a housing 310' of the movable clutch part 306'.

Figure 16:
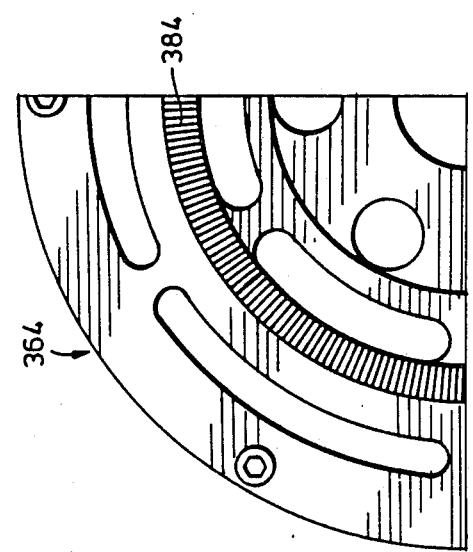
FIG. 16 is a partial elevational view of one of the components of the clutch of FIG. 15.

Clutch 338 includes respective clutch plates 340 and 342 which have opposed faces that meet in a common plane 344. This is the plane at which the clutch and spindle separate when the carrier of the machine is to be indexed. The opposing faces of the two clutch plates 340 and 342 have respective annular series of interengageable teeth which are generally indicated at 346. FIG. 16 shows a similar series of teeth of the clutch shown in FIG. 15; the teeth 346 will be essentially similar.

Clutch plate 340 is coupled to the movable part 306' of clutch 336 by a hollow shaft 348. An annular recess 350 in the face of clutch plate 340 remote from its toothed face receives an annular coil 352 that is carried by a stationary housing 354 rotationally supported on shaft 348 by a bearing 356.

Clutch plate 342 is made of a ferromagnetic material and is mounted on a bracket 358 at the end of the spindle 20', for movement towards and away from clutch plate 340 over a distance just sufficient to permit the respective sets of teeth to clear one another for indexing of the spindle relative to the drive motor. Spring-loaded bolts such as those shown at 226 at FIG. 8 are used to couple the clutch plate 342 to the bracket 358 but have not been shown in FIG. 14.

Figure 15:
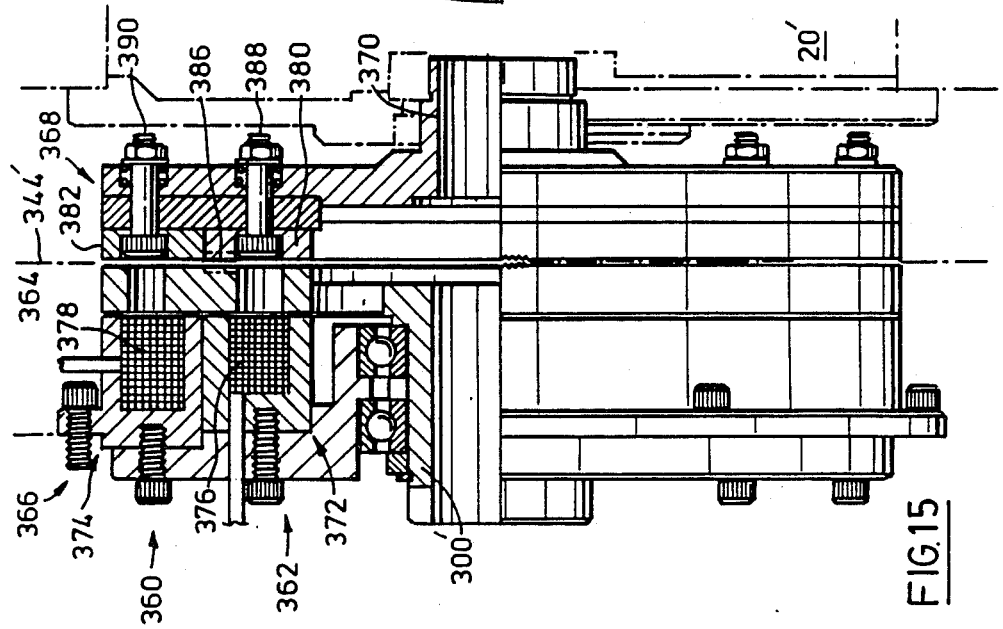

Turning now to the embodiments of FIGS. 15 to 18, in these cases, the friction disc clutch and toothed clutch are in effect arranged concentrically one within the other. In FIG. 15, the friction disc clutch is denoted by reference numeral 360 while the toothed clutch is denoted 362. Corresponding primed reference numerals are used in FIG. 17. A clutch plate 364 carried by input shaft 300' is positioned between a stationary clutch part 366 and a movable part 368 that is connected to the spindle 20' by an output shaft 370. The stationary clutch part 366 carries respective inner and outer electromagnets 372 and 374 having respective coils 376 and 378. Both electromagnets are annular and magnet 372 is concentrically arranged with magnet 374.

The movable clutch part 368 includes concentric annular clutch plates 380 and 382 that correspond with the respective magnets. Plate 382 is a plain clutch plate having a flat outer face that engages the corresponding face of clutch plate 364 when electromagnet 374 is energized.

As shown in FIG. 16, clutch plate 364 is provided with an annular series of teeth 384 that co-operate with a correspondingly positioned, similar annular series of teeth 386 on clutch plate 380.

The respective clutch plates 380 and 382 are supported for movement towards and away from plate 364 by way of spring-loaded bolts 388 and 390 which are again similar to the bolts 226 shown in FIG. 8. The clutch plates 380 and 382 are made of ferromagnetic material so that they can be selectively drawn towards and frictionally engage the clutch plate 364 by energizing the respective electromagnets 372 and 374. The intention is that, when a drive motor is to be coupled to a particular spindle, electromagnet 374 will first be energized to draw plate 382 into driving engagement with plate 364 to in effect bring the spindle up to the motor speed. The toothed clutch 372 will then be engaged by energizing electromagnet 372 to in effect positively lock the drive motor to the spindle. It is anticipated that the toothed clutch should ensure continuity of drive even at extraordinarily high machining loads. At the same time, the friction clutch 360 will permit the drive to be taken up without the need to slow down the drive motor to an unacceptably low level. In other words, the speed of the drive motor can be kept up, which should enhance motor life.

Figure 18:
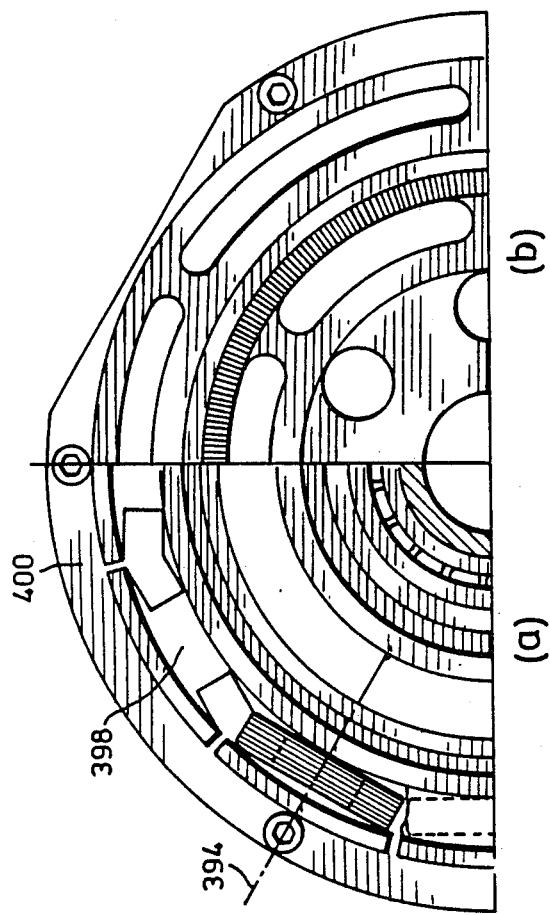
FIGS. 18a and 18b are somewhat similar views of components of the clutch of FIG. 17.
Figure 17:
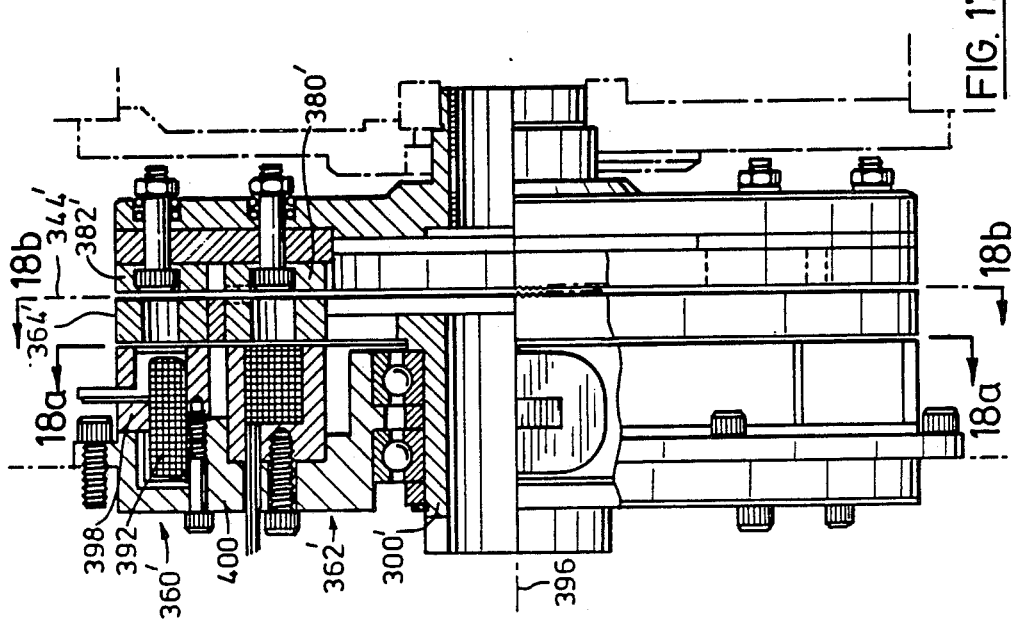
Figure 20:
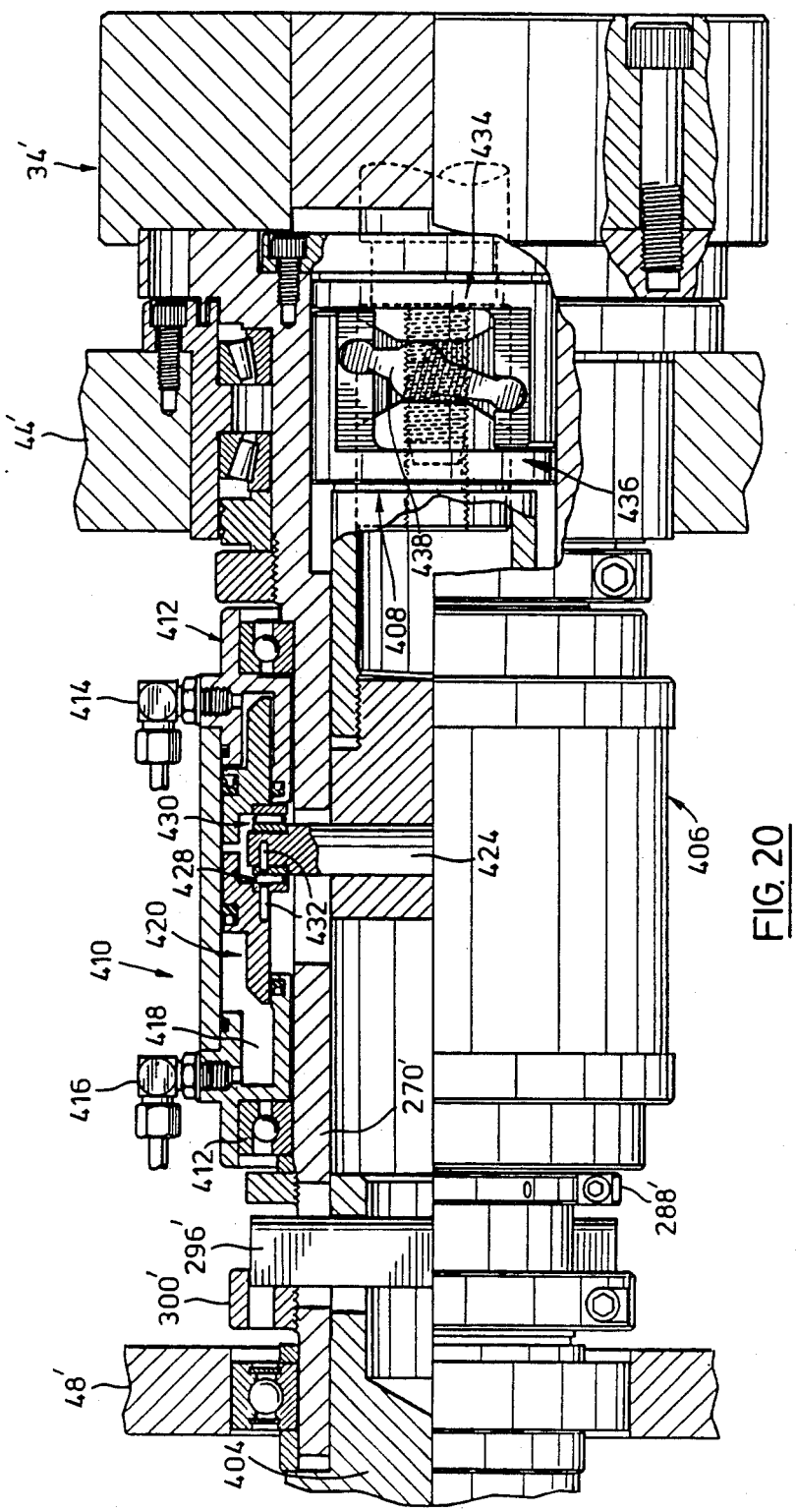

The clutch arrangement shown in FIGS. 17 and 18 is essentially very similar to that of FIGS. 15 and 16 and again primed reference numerals have been used to denote corresponding parts. The primary difference between the two arrangements lies in that the electromagnet used in the friction clutch 360', instead of having a large annular winding extending about the longitudinal axis of the drive transmitting shaft 300', has a series of smaller windings that extend about respective axes that are disposed radially with respect to the longitudinal axis of shaft 300'. One of these windings is shown at 392 in FIG. 18a extending about a radial axis 394 normal to the longitudinal axis 396 of shaft 300'. A series of other similar windings will be wound onto radial armatures 398 (FIG. 18a) in a housing 400 forming a component of the stationary clutch part 366'.

It is believed that windings of this form will have the advantage of reducing any tendency for magnetic interference between the two clutches. Thus, by providing individual windings of the form shown, it is believed that the magnetic flux lines emanating from the windings will be shaped so that they "capture" only the friction clutch plate 382'. Clearly, it would be undesirable if the toothed clutch 362' were accidentally engaged when the electromagnet for clutch 360' were energized.

Reference will now be made to FIGS. 19 to 24 in describing an alternative form of spindle assembly that may be used in the machine provided by the invention. The assembly incorporates a combined hydraulic/mechanical arrangement for actuating the chuck of the spindle. Certain components of the spindle assembly are similar to components that have been described previously primarily in connection with FIG. 7 and primed reference numerals have therefore been used to denote parts that correspond with parts described previously.

As in the embodiment of FIG. 7, the spindle assembly is supported between respective plates 44' and 48' of the carrier of the machine by bearings. A chuck 34' is shown at the right-hand end of the spindle as drawn and has jaws (not shown) that are actuated by a shaft or push rod indicated in ghost outline in FIGS. 19 and 20 at 402. The push rod operates the jaws of the chuck in conventional fashion (not shown). Drive is transmitted to the chuck through a main cylindrical body member 270' of the spindle from an input drive shaft 404 at the left-hand end of the spindle as drawn. A transverse pin 296' connects the drive shaft 404 to the body member 270' as described previously and is located between respective nuts 300' and 288'. As in the preceding embodiment, pin 296' transmits drive from the shaft 404 to the chuck. The chuck and associated components can be separated from the remainder of the spindle after removing pin 296'.

Axial movement of the chuck operating push rod 402 is effected by means of a hydraulic actuator 406 through the intermediary of a mechanical shuttle assembly 408 that imparts a mechanical advantage; that is, assembly 408 in effect amplifies the force generated by the hydraulic actuator 406.

Actuator 406 includes a stationary housing 410 that is supported on the main body member 270 by bearings 412. Hydraulic fluid couplings 414, 416 on housing 410 communicate with an hydraulic chamber or cylinder 418 inside the housing. Chamber 418 receives an annular piston 420 that is slidable in housing 410 in the axial direction of the spindle from the position in which it is shown in FIG. 19 at the left-hand end of the housing as drawn to the right-hand position shown in FIG. 20. Movement of the piston is of course effected by selectively delivering hydraulic fluid to the relevant one of the couplings 414, 416.

Movement of the piston between its end positions is transmitted to a block or plug 422 within the cylindrical body member 270' of the spindle by a transverse pin 424 that extends through the block and is coupled to the piston at its ends (only one of which is shown). Block 422 is threaded into an end of a sleeve 426 that is mounted for axial sliding movement within body member 270' and which is coupled to the shuttle assembly 408 as will be described.

Referring back to the piston 420, it will be appreciated that the piston and the associated housing 410 remains stationary while the body member 270 rotates during machining. Pin 424 must therefore be capable of turning about the longitudinal axis of the spindle, with respect to the piston, as body member 270' turns. This is accomplished by locating the respective ends of the pin 424 with respect to the piston by respective needle bearing assemblies 428 and 430 on opposite sides of the pin. Each assembly comprises respective inner and outer races, the outer one of which is secured to the piston while the inner race is secured to the pin 424, while rollers between the races that are disposed with their axes radial to the longitudinal axis of the spindle. The respective races are "staked" to the pin and piston respectively by stakes indicated at 432 in the case of bearing 428.

FIG. 21 shows the arrangement in plan and it will be seen that the pin 424 has flats at opposite sides which receive the inner races of the respective bearings. In summary, the arrangement described permits the pin 424 to turn about the longitudinal axis of the spindle while transitting axial movement of the piston 420 to the shuttle assembly 408. A comparison of FIGS. 19 and 20 will show the positions of the components of the spindle assembly with the piston 420 of the chuck actuator in respective left- and right-hand positions.

FIGS. 22 to 24 show the shuttle assembly 408 in detail. The principal components of the assembly are a fixed "shell" or "cup" 434 and a similar but movable shell or cup 436 which is coupled the sleeve 426 that is displaced axially by movement of the chuck actuating piston (see FIGS. 19 and 20). The two shells 434 and 436 are connected by a pair of pivoted links 438 that extend through slots in a shuttle 440 connected to the chuck actuating push rod 402 (see FIGS. 19 and 20). The two shells have respective top limbs 434a and 436a that lie side-by-side in sliding contact as best seen in FIG. 23, and respective bottom limbs 434b and 436b that are similarly arranged. As best seen in FIG. 24, the top and bottom limbs of the same shell are offset to opposite sides of a vertical centre line through the spindle as seen in cross-section. In other words, the top limb of one shell is disposed above the bottom limb of the other as seen in transverse section through the spindle (FIG. 24). The links 438 couple the top limb of one shell to the bottom limb of the other and the links are at the same time pivotally located within the shuttle 440 as best seen in FIG. 22.

Rounded enlargements 438a at the ends of the links are received in generally complimentary seats in the respective shells while each link is enlarged at a position above the centre of its length to provide convex pivot surfaces 438b that engage corresponding surfaces in recesses 440a in the shuttle that allow the links to pivot on the surfaces 438b. The fact that these enlargements are above the centre of the links means that a mechanical advantage is achieved. Thus, axial movement of the movable shell 436 in response to movement of piston 420 (FIGS. 19 and 20) will cause the links 438 to pivot on the fixed shell 434, causing the shuttle 440 to move as a consequence of the pivotal movement of the links. It will be appreciated that the links in effect act as levers and that the arrangement achieves a mechanical advantage in terms of the force transmitted to the chuck from the piston 420.

It should be noted that references in the preceding description to "top" and "bottom" refer to the orientation of the parts as shown in the drawings and that the shuttle assembly will rotate in use and may adopt any one of an infinite number of angular positions about the longitudinal axis of the spindle.

Reference will finally be made to FIGS. 25 and 26 in describing a further alternative form of spindle. Again, primed reference numerals will be used to denote parts shown in previous views.

FIG. 25 shows an electromagnetic clutch assembly 338' similar to the assembly shown in FIG. 14. Drive is transmitted from clutch plate 342' to a drive shaft 442 that may be an input shaft to a transmission 240'. The transmission is shown in ghost outline only since it is an optional component; the transmission may be omitted and the shaft 442 continued as a plain drive transmitting shaft as indicated in dotted outline. To the right of the transmission as shown in FIG. 25, shaft 442 either continues as the same shaft (where there is no transmission) or as an output shaft from the transmission. Shaft 442 is then coupled by a pin 296 to a cylindrical member 270' forming the main drive coupling to the chuck 34' as described previously. The chuck has an actuating push rod 402' that is axially displaced to operate the jaws of the chuck by a sleeve 446 that is itself axially displaced by a chuck actuator shown generally at 448 in FIG. 25. The actuator is shown in partial section in FIG. 26, which will now be described.

Referring now to that view, a stationary housing 450 is mounted on the main body member 270' of the spindle by way of bearings 452 that run on a sleeve 454 carried by member 270'. A cylinder 456 within sleeve 454 has as a piston 458 having a piston rod 460 that is connected to the sleeve 446 shown in FIG. 25.

Housing 450 carries a series of hydraulic couplings 462, 464, 466 that communicate with hydraulic passageways and ports inside the housing. The passageways and ports for coupling 462 only have been shown and include a main passageway 468 that communicates with ports 470 communicating in turn with annular passageways 472 in sleeves that encircle the rotating sleeve 454. Ring seals 474 are provided to guard against leakage of hydraulic oil. These passageways 472 in turn communicate with ports 476 through sleeve 454 for delivering oil to and from the chamber formed by cylinder 456. Thus, by delivering hydraulic oil to appropriate ones of the ports 462, 464 and 466 and allowing it to exit from other ports, piston 458 is displaced from end-to-end in the cylinder, operating the chuck 34'.

It will, of course, be understood that the preceding description relates to particular preferred embodiments of the invention only and that many modifications are possible within the broadest scope of the invention. For example, it will be understood that various features of the invention may be used independently of one another. For example, the feature of stationary individual drive motors for the spindles could be used with a carrier for indexing the spindles other than of the form specifically described. It would, in fact, be possible (although not desirable) to index the spindles using a conventional carrier structure. Conversely, the particular carrier structure described, in which the carrier includes a central support shaft, could be used with other spindle drive arrangements, even if conventional character.

Among other possible modifications are the fact that spindles of different forms could be used and that the number of stations provided in the machine may vary. Normally, the minimum number of stations would be two and the maximum eight but again there is no limitation to these particular numbers. Preferably, a loading-/unloading station is provided because this allows loading and unloading to be carried out at other stations. However, again this is not essential; loading and unloading could be carried out simply by temporarily arresting one of the spindles at a normal machining station.

Spindles of the form provided by the invention may be used in other machine tools.

We claim:

1. A machine tool comprising:

a frame;

a plurality of spindles each rotatable about an axis and each including a chuck at a first end of the spindle, a driven clutch member at a second end of the spindle, and means intermediate said ends for operating the chuck to respectively engage or release a workpiece to be machined;

a carrier supporting said spindles in axially parallel postions with said chuck and driven clutch member accessible at respective first and second ends of the carrier and said chuck operating means accessible between said ends;

means supporting the carrier for turning about a longitudinal axis parallel to said spindle axes;

means for indexing the carrier about said longitudinal axis to move the spindles between defined stations;

locking means acting between the frame and carrier and operable to lock the carrier with respect to the frame in each of a plurality of defined angular positions and precisely locate the spindles at said stations;

the carrier support mans, indexing means and locking means permitting access to said chuck operating means of all of the spindles when the spindles are at said defined stations; and, spindle drive means supported by said frame adjacent said second end of the carrier and including a number of individual spindle drive mtors each disposed in a fixed position aligned with one of said stations, and, in association with each said motor, clutch means including a driving clutch member co-operable with a said driven clutch member of a spindle at a relevant said station, said clutch means being operable to drivingly couple each spindle drive motor to the relevant one of said spindles by engagement of said clutch members when the carrier has been indexed to bring that spindle to a said station at which a machining operation is to be performed, and being disengageable to permit indexing of the carrier.

2. A machine tool as claimed in claim 1, wherein said stations between which the spindles are indexed include a loading/unloading station at which a spindle can be brought to rest for loading and unloading of workpieces, and at least one machining station at which a machining operation can be performed on a workpiece, and wherein the number of drive motors corresponds to the number of machining stations, there being no drive motor corresponding to said loading/unloading station.

3. A machine tool as claimed in claim 2, Further comprising brake means supported by said frame adjacent said second end of the carrier and disposed in a fixed position aligned with said loading/unloading station, said brake means being adapted to engage and hold stationary a spindle at said loading/unloading station.

4. A machine tool as claimed in claim 1, wherein said carrier includes a central shaft defining said axis about which the carrier can be indexed, and spindle support means coupled to said shaft inwardly of its ends and comprising a series of plates spaced along and disposed normal to said shaft and between which said spindles extend, whereby said chuck operating means of the spindles are accessible between said plates.

5. A machine tool as claimed in claim 4, wherein said carrier support means comprises means supporting said central shaft on the frame at positions outwardly of the carrier for permitting turning of the carrier about its said axis to index the spindles between the said stations, the shaft extending beyond said first end of the carrier a distance sufficient to permit said indexing and machining of workpieces at machining stations without interference by said support means.

6. A machine tool as claimed in claim 4, wherein said plates of the spindle carrier are formed with openings receiving the spindles and wherein each spindle comprises separable first and second parts including respectively said chuck and driven clutch member, and means releasably coupling said parts of the spindle so as to permit independent removal of either said part from the carrier.

7. A machine tool as claimed in claim 1, wherein each said spindle includes transmission means between said driven clutch member at the second end of the spindle and said chuck, said transmission means being adapted to provide a predetermined fixed speed transmission ratio between said driven clutch member and the chuck.

8. A machine tool as claimed in claim 7, wherein said transmission means comprises a planetary gear transmission.

9. A machine tool as claimed in claim 1, wherein said clutch means comprises an electromagnetic clutch associated with the or each spindle drive motor an including means adapted to electromagnetically couple said driving clutch member and the driven clutch member of any one of said spindles.

10. A machine tool as claimed in claim 9, wherein said carrier indexing means comprises intermittent drive means coupled to said shaft adjacent said second end of the carrier and adapted to intermittently turn said carrier about its axis to index said spindles in accordance with the required operating mode of the machine tool, and locking means adapted to lock said carrier to said frame when said intermittent drive means is not in operation.

11. A machine tool as claimed in claim 10, wherein said intermittent drive means comprises a motor driven drive shaft and mechanical means coupling said drive shaft and carrier central shaft, wherein said locking means comprises at least one mechanical locking device between said frame and carrier, and wherein the indexing means further comprises a mechanical interlock between said mechanical coupling means and said locking device adapted to release said device immediately prior to indexing of the carrier and re-engage said device immediately after said indexing has been completed.

12. A machine tool as claimed in claim 11, wherein said mechanical means coupling the motor driven drive shaft and carrier central shaft comprises a Geneva cam mechanism comprising a hub carried by said carrier central shaft and including a plurality of cam tracks, and a driving cam follower driven from said shaft and adapted to engage in said cam tracks and intermittently rotate said hub in accordance with the required operating conditions of the machine tool.

13. A machine tool as claimed in claim 1, wherein each said spindle drive motor is an infintiely variable electric motor, whereby the machining speed of a spindle driven by said motor can be infinitely varied according to required machining conditions.

14. A machine tool as claimed in claim 1, wherein said clutch means includes, in association with at least one of said spindle drive motors, first and second clutches comprising a friction clutch and a toothed clutch one of which includes a said driven clutch member and a cooperable said driving clutch member.

15. A machine tool as claimed in claim 14, wherein said first and second clutches comprise said driving and driven clutch members and respective annular clutch plates concentrically arranged between said members one within the other, said plates comprising a friction clutch plate and a toothed clutch plate and being carried by one of said members for co-operation with the other said member, and means for selectively bringing said plates individually into co-operating relationship with the relevant said driving or driven clutch member.

16. A machine tool as claimed in claim 1, wherein said chuck operating means includes a chuck operating member that is disposed within the spindle and is displaceable axially of the spindle to operate the chuck, a piston and cylinder within the spindle connected to said chuck operating member, and means externally of the spindle for delivering hydraulic fluid to said cylinder for displacing the piston to operate the chuck.

17. A machine tool as claimed in claim 1, wherein each said chuck operating means includes a chuck operating member that is disposed within the spindle and is displaceable axially of the spindle to operate the chuck, a stationary housing mounted externally on the spindle and defining a cylinder, an annular piston within said cylinder, displaceable axially of the spindle, means for delivering hydraulic fluid to the cylinder to displace the piston, and means coupling said piston to said chuck operating member within the spindle.

18. A machine tool as claimed in claim 17, wherein said means coupling the piston to the chuck operating member includes a coupling element disposed within the spindle, said element being rotatable with the spindle and axially displaceable with the piston, and a shuttle assembly connected between said element and said chuck operating member and arranged to provide a mechanical advantage in transmitting axial movement of said element to axial movement of said member.

19. For use in a machine tool, a spindle which is rotatable about a longitudinal axis and which includes: workpiece holding means in the form of a chuck at a first end of the spindle; a driven clutch member at a second end of the spindle for direct coupling to a driving clutch member coupled to an independent spindle drive motor; transmission means in the form of a planetary gear transmission coupled between said driven clutch member and said chuck, said transmission means being adapted to provide a predetermined fixed speed transmission ratio between said driven clutch member and the chuck; a chuck operating member within the spindle; and chuck actuating means comprising a piston and cylinder coupled to said operating member and means for delivering hydraulic fluid to said piston and cylinder from externally of the spindle, to operate the chuck; the spindle comprising first and second axially adjacent parts which are separable from one another and which include respectively said chuck and said driven clutch member, and means releasably coupling said parts of the spindle so as to permit separation thereof, said releasable coupling means comprising a pin which extends transversely through the spindle for transmitting drive from said second spindle part to said first spindle part, and which is removable from externally of the assembled parts for permitting separation thereof.

20. A spindle as claimed in claim 19, wherein said chuck operating member is displaceable axially of the spindle to operate the chuck, and wherein said piston and cylinder comprise a stationary housing mounted externally on the spindle and defining said cylinder, and an annular said piston within the cylinder.

21. A spindle as claimed in claim 20, wherein said piston is coupled to the chuck operating member by coupling means comprising a coupling element disposed within the spindle, said element being rotatable with the spindle and axially displaceable with the piston, and a shuttle assembly connected between said element and said chuck operating member and arranged to provide a mechanical advantage in transmitting axial movement of said element to axial movement of said member.

22. A spindle as claimed in claim 19, wherein said chuck operating member is disposed within the spindle and is displaceable axially of the spindle to operate the chuck, wherein said piston and cylinder are disposed within the spindle and coupled to said chuck operating member, and wherein the chuck actuating means further includes a non-rotational hydraulic actuator mounted externally of the spindle for delivering hydraulic fluid to said cylinder for displacing the piston to operate the chuck.

* * * * *